United States Patent
Lamb et al.

(10) Patent No.: US 9,417,692 B2
(45) Date of Patent: Aug. 16, 2016

(54) DEEP AUGMENTED REALITY TAGS FOR MIXED REALITY

(75) Inventors: Mathew J. Lamb, Mercer Island, WA (US); Ben J. Sugden, Woodinville, WA (US); Robert L. Crocco, Jr., Seattle, WA (US); Brian E. Keane, Bellevue, WA (US); Christopher E. Miles, Seattle, WA (US); Kathryn Stone Perez, Kirkland, WA (US); Laura K. Massey, Redmond, WA (US); Alex Aben-Athar Kipman, Redmond, WA (US); Jeffrey Neil Margolis, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 424 days.

(21) Appl. No.: 13/538,683

(22) Filed: Jun. 29, 2012

(65) Prior Publication Data

US 2014/0002491 A1    Jan. 2, 2014

(51) Int. Cl.
*G09G 5/00* (2006.01)
*G06F 3/01* (2006.01)
*G02B 27/01* (2006.01)
*G06F 1/16* (2006.01)
*G06F 3/03* (2006.01)

(52) U.S. Cl.
CPC .............. *G06F 3/011* (2013.01); *G02B 27/017* (2013.01); *G06F 1/163* (2013.01); *G06F 3/012* (2013.01); *G06F 3/013* (2013.01); *G06F 3/0304* (2013.01); *G02B 2027/014* (2013.01); *G02B 2027/0141* (2013.01); *G02B 2027/0178* (2013.01); *G02B 2027/0187* (2013.01)

(58) Field of Classification Search
None
See application file for complete search history.

(56) References Cited

U.S. PATENT DOCUMENTS

| | | | |
|---|---|---|---|
| 6,023,263 A | 2/2000 | Wood | |
| 6,792,398 B1* | 9/2004 | Handley et al. | 703/2 |
| 6,822,648 B2 | 11/2004 | Furlong et al. | |
| 2003/0184567 A1* | 10/2003 | Fujiki | 345/660 |
| 2010/0182340 A1 | 7/2010 | Bachelder et al. | |
| 2010/0214111 A1 | 8/2010 | Schuler et al. | |
| 2011/0075257 A1* | 3/2011 | Hua et al. | 359/464 |
| 2011/0141254 A1 | 6/2011 | Roebke et al. | |
| 2011/0187706 A1* | 8/2011 | Vesely et al. | 345/419 |

(Continued)

OTHER PUBLICATIONS

Mulder, Jurriaan D., "Realistic Occlusion Effects in Mirror-Based Co-Located Augmented Reality Systems", In Proceedings of the IEEE Conference on Virtual Reality, Mar. 12, 2005, 6 pages.

(Continued)

*Primary Examiner* — James A Thompson
*Assistant Examiner* — Xilin Guo
(74) *Attorney, Agent, or Firm* — Dan Choi; Judy Yee; Micky Minhas

(57) ABSTRACT

Techniques are provided for rendering, in a see-through, near-eye mixed reality display, a virtual object within a virtual hole, window or cutout. The virtual hole, window or cutout may appear to be within some real world physical object such as a book, table, etc. The virtual object may appear to be just below the surface of the physical object. In a sense, the virtual world could be considered to be a virtual container that provides developers with additional locations for presenting virtual objects. For example, rather than rendering a virtual object, such as a lamp, in a mixed reality display such that appears to sit on top of a real world desk, the virtual object is rendered such that it appears to be located below the surface of the desk.

21 Claims, 18 Drawing Sheets

(56) References Cited

U.S. PATENT DOCUMENTS

2011/0316880 A1    12/2011   Ojala et al.
2012/0077582 A1*    3/2012   Noge .............................. 463/30
2013/0335301 A1*   12/2013   Wong et al. ....................... 345/8

OTHER PUBLICATIONS

Starner, et al., "Augmented Reality Through Wearable Computing", In Presence Teleoperators and Virtual Environments, vol. 6, Issue 4, Aug. 1997, 24 pages.

Klein, et al., "Sensor Fusion and Occlusion Refinement for Tablet-based AR", In Proceedings of the 3rd IEEE/ACM International Symposium on Mixed and Augmented Reality, Nov. 2, 2004, 10 pages.

Breen, et al., "Interactive Occlusion and Automatic Object Placement for Augmented Reality", In Proceedings of the Computer Graphics Forum, vol. 15, Issue 3, Aug. 1996, 12 pages.

Hilsmann, et al., "Tracking and Retexturing Cloth for Real-Time Virtual Clothing Applications", In Proceedings of the 4th International Conference on Computer Vision/Computer Graphics Collaboration Techniques, May 4, 2009, 12 pages.

\* cited by examiner

FIG. 15A
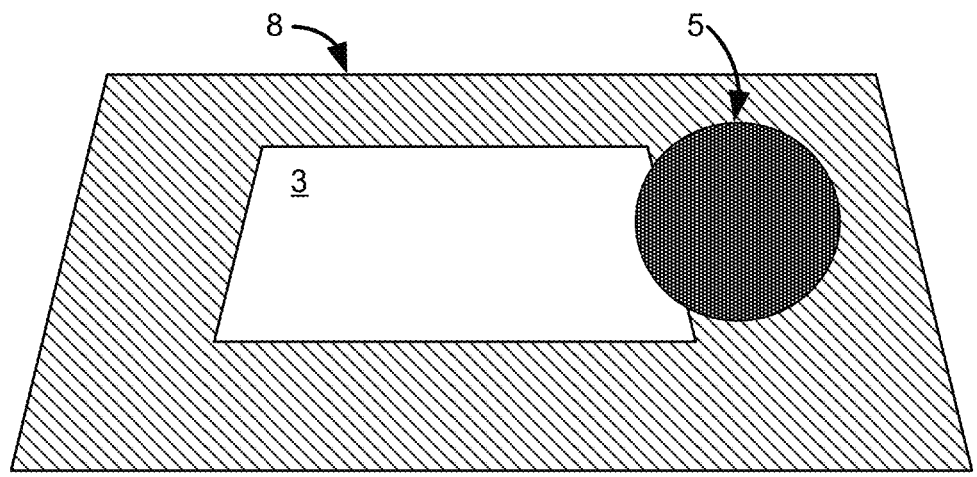
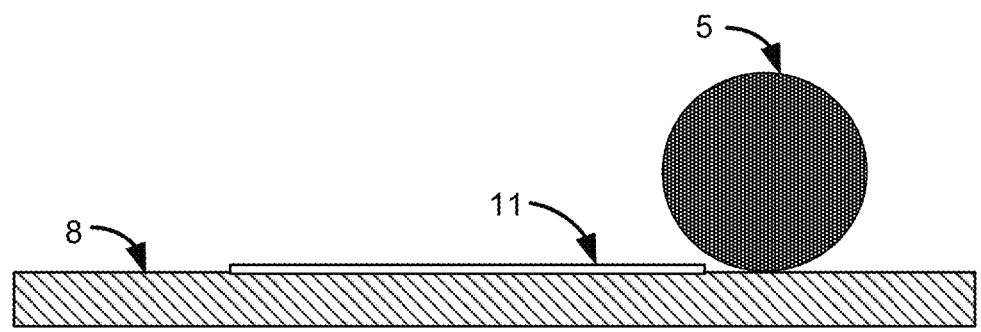
FIG. 15B

DEEP AUGMENTED REALITY TAGS FOR MIXED REALITY

BACKGROUND

Augmented or mixed reality is a technology that allows virtual imagery to be mixed with a user's actual view of the real world. A see-through, near-eye mixed reality display may be worn by a user to view the mixed imagery of virtual and real objects. The display presents virtual imagery in the user's field of view. A see-through, near-eye mixed reality display is a type of head mounted display.

SUMMARY

Techniques are provided for deep augmented reality tags for see-through, near-eye mixed reality displays. In one embodiment, the mixed reality display makes it appear that there is a virtual hole in some real world object. Furthermore, the display may make it appear that the virtual hole contains a virtual object. Since the user is free to move about when wearing the mixed reality display, their perspective of the virtual hole and its contents may change. This provides application developers with additional locations for presenting data. The virtual object could be moved from within the virtual hole to outside, as directed by the application or the user.

One embodiment includes a method for rendering, in a see-through, near-eye mixed reality display, a virtual object within a virtual hole. A location is determined for the virtual hole to be rendered in the see-through, near-eye, mixed-reality display device with respect to a real world environment. The portions of the virtual object within the virtual hole that should be visible from the perspective of a user wearing the see-through, near-eye, mixed-reality display device are determined. The virtual object is rendered within the virtual hole in the see-through, near-eye, mixed-reality display device to present the illusion that the virtual object is within the virtual hole.

One embodiment includes a display system for rendering a virtual object within a virtual hole in a see-through, near-eye mixed reality display. The system comprises a see-through, near-eye mixed reality display device, and logic in communication with the display device and the image sensor. The logic is configured to determine a boundary for a virtual hole with respect to a real world object. The virtual hole is a cutout in the real world object to a virtual world. The logic determines a virtual world location for a virtual object with respect to the virtual hole. The logic renders the virtual object within the virtual hole in the see-through, near-eye, mixed-reality display device from the perspective of the user wearing the see-through, near-eye, mixed-reality display device.

One embodiment includes a computer storage device having instructions stored thereon which, when executed on a processor, cause the processor to render a virtual object within a virtual hole rendered in a head mounted display device. Using sensor data, a physical tag is identified in an environment. A virtual cutout to be rendered in a real world object is determined based on the location of the physical tag. A virtual world location is determined for a virtual object to be rendered within the virtual cutout in the head mounted display device. The portions of the virtual object that should and should not be visible from the perspective of a user wearing the head mounted display device looking into the virtual cutout are determined. The virtual object is rendered within the virtual cutout with the portions that should not be visible from the perspective of the user occluded.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

In the drawings, like-numbered elements correspond to one another.

FIG. 15A shows a view from the perspective of a user sitting at the table such that the user can see partly into the virtual hole.

FIG. 15B shows a side view perspective in which the virtual object is being rendered on the surface of the table.

DETAILED DESCRIPTION

Techniques are provided for deep augmented reality tags in a see-through, near-eye mixed reality display. An augmented reality tag may be any marker that can be identified by a system that supports the mixed reality display. In one embodiment, the system determines where to place the virtual hole based on the location of the marker. The system renders, in the see-through, near-eye mixed reality display, a virtual object within a virtual hole, window or cutout. The virtual hole, window or cutout may appear to be within some real world physical object such as a book, table, etc. The virtual object may appear to be just below the surface of the physical object. In a sense, the virtual world could be considered to be a virtual container that provides developers with additional locations for presenting virtual objects. For example, rather than rendering a virtual object, such as a lamp, in a mixed reality display such that appears to sit on top of a real world desk, the virtual object is rendered such that it appears to be located below the surface of the desk.

However, the user does not necessarily see the entire virtual object from all perspectives. Since the user is free to move about when wearing the mixed reality display, their perspective of the virtual hole and its contents may change. The virtual object could be moved from within the virtual hole to outside, as directed by the application or by the user.

Figure 1:
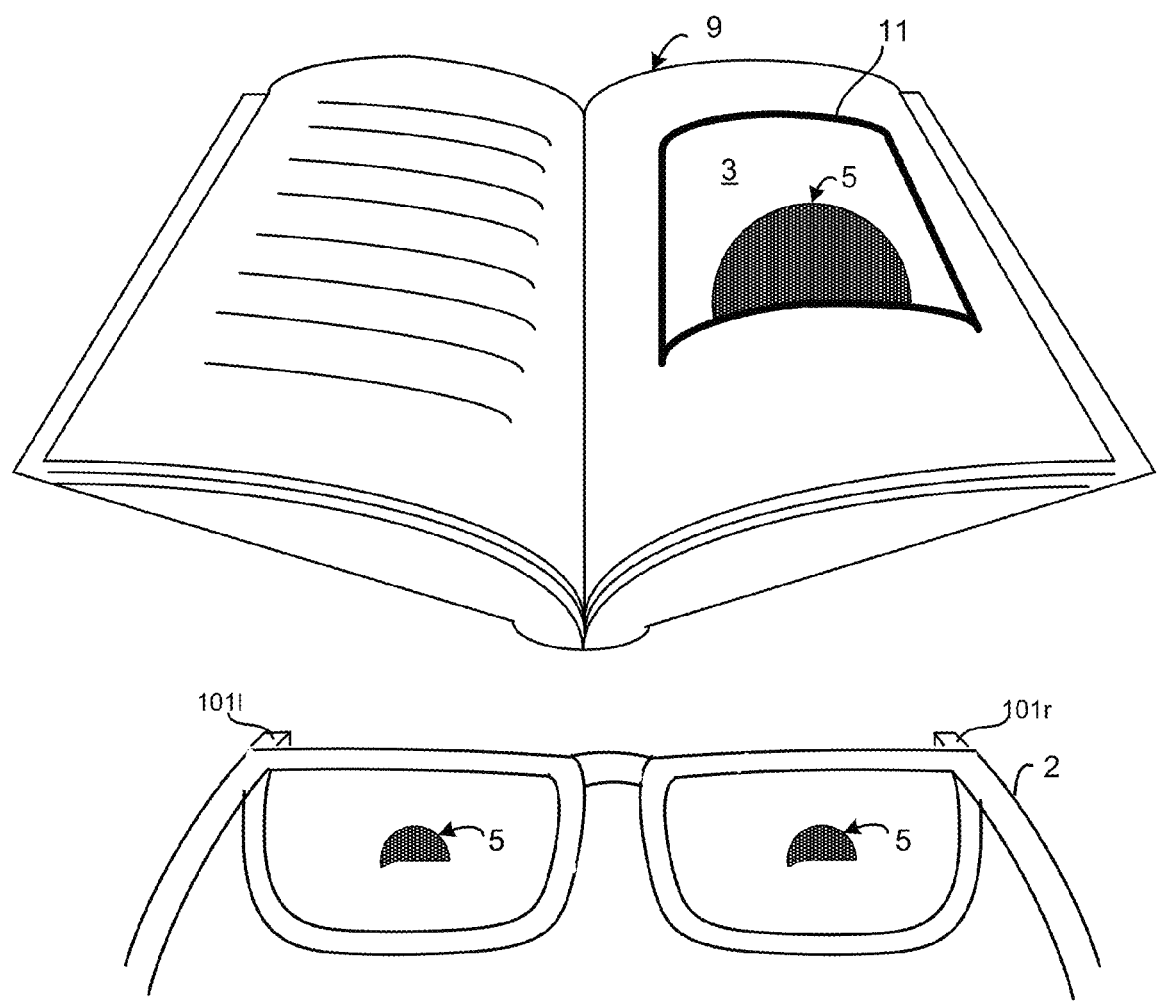
FIG. 1 is a diagram of a virtual object being rendered in a virtual hole, in accordance with one embodiment.

FIG. 1 is a diagram of a virtual object being rendered in a virtual hole, in accordance with one embodiment. In this example, a real world physical book 9 is used to assist in determining a location to render the virtual object 5. The physical book 9 has a physical tag 11 that can be identified by the system to determine where to render the virtual object. A see-through, near-eye mixed reality display device 2 has outward facing cameras 101l, 101r for recording digital images and videos. The system may use data from these cameras 101 to identify the physical tag 11.

The physical tag 11 could have any pattern or image on it that can be recognized by the system. As one example, the physical tag 11 may be a picture of a framed mirror or a clear piece of glass. These examples of a mirror or glass are for purpose of discussion. The virtual object 5 is being rendered in eyepieces of the see-through, near-eye mixed reality display device 2. To the user, the virtual object 5 appears to be located beneath the physical tag 11, in this example. Note that for purposes of illustration, the virtual object 5 is depicted in the book 9. It will be understood that the actual image is being rendered in the eyepieces of the display device 2. In this example, the virtual object 5 is rendered in each eyepiece. The display device 2 will be discussed in further detail below.

In this example, the physical tag 11 more or less coincides with a virtual hole 3. A virtual hole 3 is a virtual image that is presented in the display device 2 to provide the illusion that there is a hole 3 or cutout in the book 9. Note that the virtual hole 3 need not coincide with the physical tag 11.

Note that the display device 2 may allow the user to see both real world objects and the virtual image. In this example, the book 9 is an actual real world object. The user is able to read the text and clearly see images in the book 9. The physical tag 11 could be plainly visible to the user without the aid of the display device 2. As one example, the physical tag 11 could appear to be a framed mirror.

In this example, the virtual object 5 is ball shaped. However, note that from this perspective a portion of the virtual object 5 is occluded. In this example, the physical tag 11 identifies the location for a cutout or window in the book 9 into a virtual world below. If the user moves such that they are overhead of the tag 11, they will be able to see more of what is inside of the virtual hole.

Figure 2A:
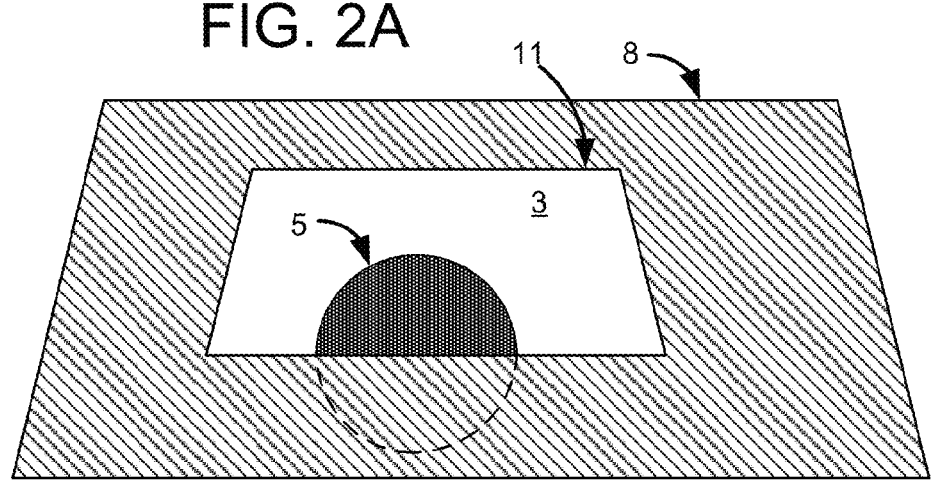
FIG. 2A, FIG. 2B, and FIG. 2C show a virtual object rendered in a virtual hole from various perspectives of the user.
Figure 2B:
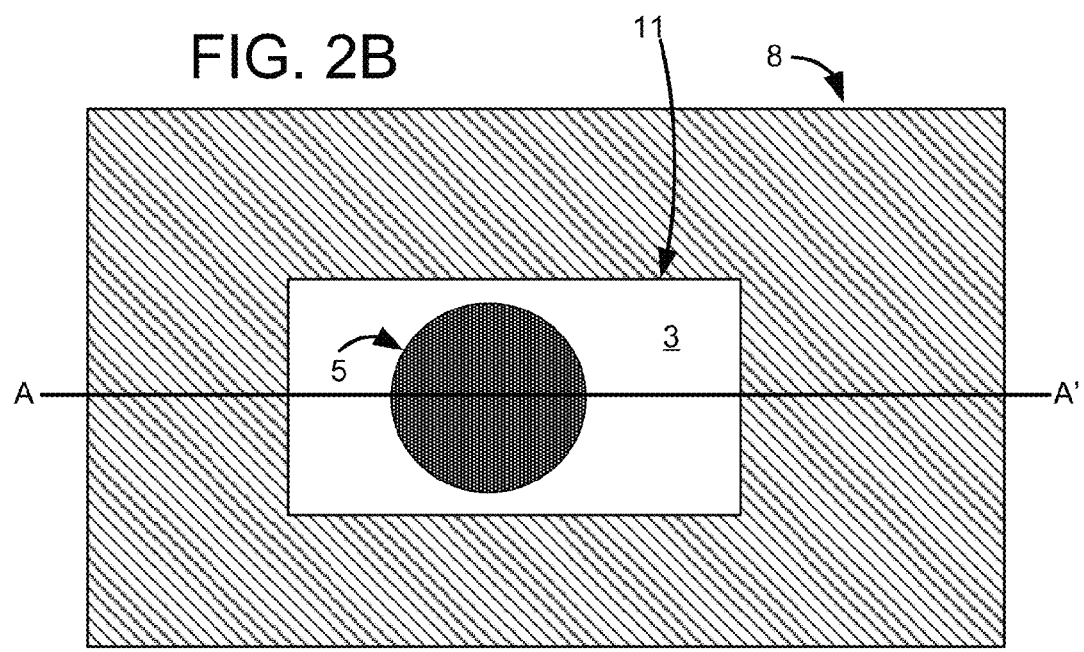
Figure 2C:
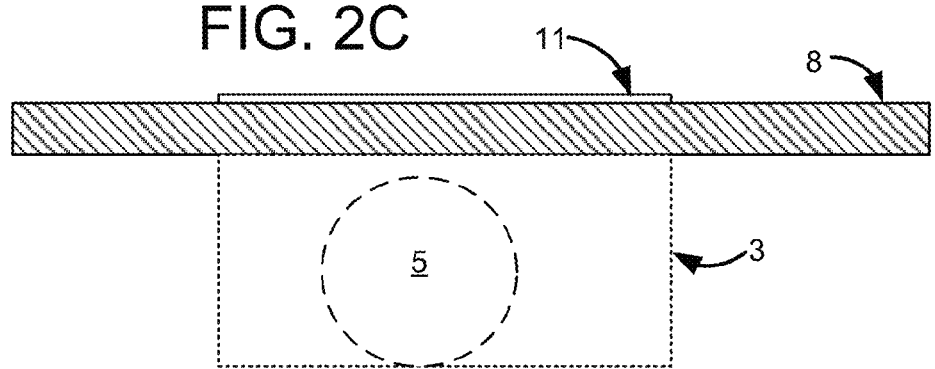

To further illustrate, FIGS. 2A-2C show a virtual object 5 rendered in a virtual hole 3 from various perspectives of the user. FIG. 2A is a perspective from an angle as is the user is sitting at a table and looking at a book. FIG. 2B is a top perspective view. FIG. 2C is a side perspective view along line A-A' in FIG. 2B. As noted above, the virtual object 5 is actually being rendered in a see-through, near-eye display device 2. FIGS. 2A-2C depict a representation of the mixed reality that a user will see when wearing the display device 2. Dashed lines represent elements that are not actually visible to the user.

In this example, the physical tag 11 is a printed sheet of paper. This physical tag 11 could have any pattern or image on it that can be recognized by the system. The physical tag 11 is sitting on top of a table 8. The system may render a virtual hole 3 based on the location of the physical tag 11. By rendering a virtual hole 3 in the display device 2 the user is given the sense that there is a cutout or window in the table 8 (or other real world element). The virtual object 5 is being rendered in the virtual hole 3.

In FIG. 2A, the lower portion of the virtual object 5 is occluded. To the user, it appears that the table 8 is occluding the lower portion of the virtual object 5. FIG. 2B shows that the user can see all of the virtual object 5 in the virtual hole 3 from the top perspective. In this example, the virtual hole 3 more or less coincides with the physical tag 11. As noted above, this is not always the case.

FIG. 2C shows that from the side perspective, the user will not see the virtual object 5. A dotted outline of the virtual object 5 is depicted in FIG. 2C to show its location in the virtual world. However, note that the virtual object 5 is not rendered in the display 2 when the user is looking from this perspective, in accordance with one embodiment. Thus, the virtual object 5 is not visible to the user from this side perspective, in accordance with one embodiment.

The location of the virtual hole 3 in one embodiment of the virtual world is represented by a dotted line in FIG. 2C. Again, this is just to represent its location for the sake of discussion. The virtual hole 3 is not rendered in the display device 2 from this side perspective in this embodiment. Therefore, the user will simply see the edge of the physical tag 11 sitting on the table 8 from this side perspective.

Note that the virtual hole 3 is not required to be bounded as depicted by the dotted lines below the tag 11 in FIG. 2C. Also, even when the virtual hole 3 is considered to have boundaries, those boundaries need not be static. For example, the size of the virtual hole can grow or shrink based on the amount and size of virtual objects 5 in the virtual hole 3.

Figure 3A:
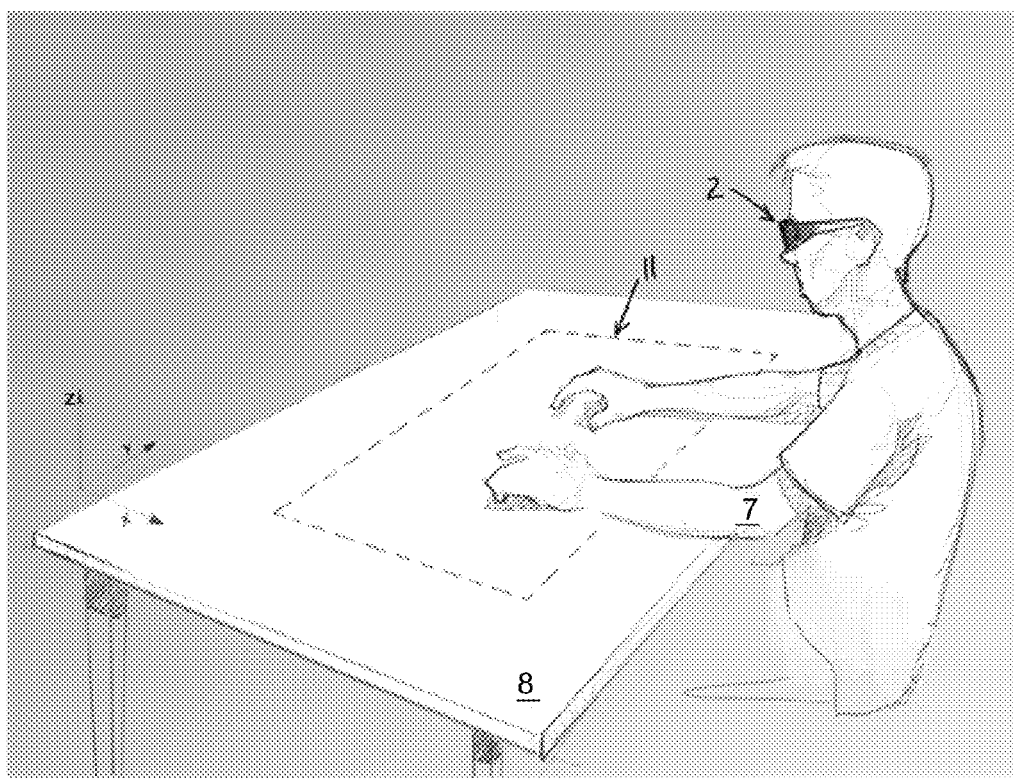
FIG. 3A shows a user sitting at a table and wearing a see-through, near-eye mixed reality display device.

FIG. 3A shows a user 7 sitting at a table 8 and wearing a see-through, near-eye mixed reality display device 2. The user 7 is has his hands over the physical tag 11 so that the user 7 is able to work with the virtual objects (not depicted in FIG. 3A). For example, the user 7 can place virtual objects into the virtual hole and remove them, in one embodiment. Also, an application associated with the rendering of the virtual objects could move the virtual object 5 in and out of the virtual hole. Examples of the user working with virtual objects will be discussed below.

Figure 3B:
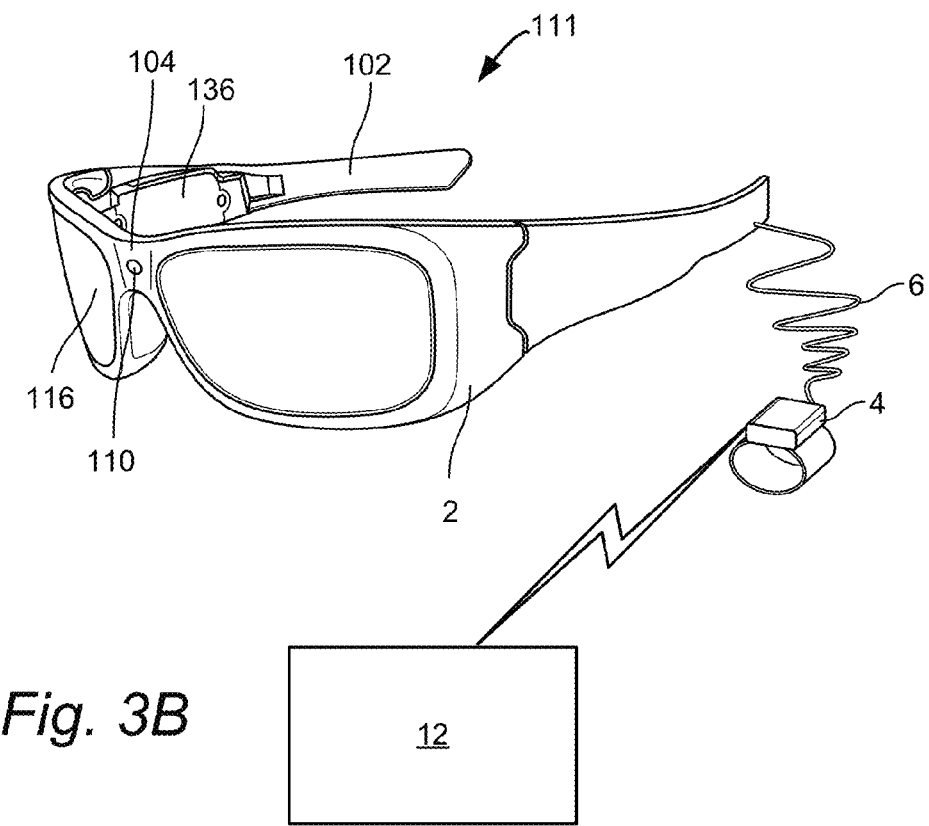
FIG. 3B is a diagram depicting example components of one embodiment of an HMD device.

FIG. 3B shows further details of one embodiment of an HMD system ("system") 111. The HMD system 111 includes an HMD device 2 in communication with processing unit 4 via wire 6. In other embodiments, HMD device 2 communicates with processing unit 4 via wireless communication. Note that the processing unit 4 could be integrated into the HMD device 2. Head-mounted display device 2, which in one embodiment is in the shape of glasses, including a frame with see-through lenses, is carried on the head of a person so that the person can see through a display and thereby see a real-world scene which includes an image which is not generated by the HMD device. More details of the HMD device 2 are provided below.

In one embodiment, processing unit 4 is carried on the user's wrist and includes much of the computing power used to operate HMD device 2. Processing unit 4 may communicate wirelessly (e.g., using WIFI®, Bluetooth®, infrared (e.g., IrDA or Infrared Data Association standard), or other wireless communication means) to one or more hub computing systems 12.

In one embodiment, hub computing system 12 may include a processor such as a standardized processor, a specialized processor, a microprocessor, or the like that may execute instructions stored on a processor readable storage device for performing the processes described herein.

Processing unit 4 and/or hub computing device 12, may be used to recognize, analyze, and/or track human (and other types of) targets. For example, the position of the head of the person wearing HMD device 2 may be tracked to help determine how to present virtual images in the HMD 2.

Figure 4:
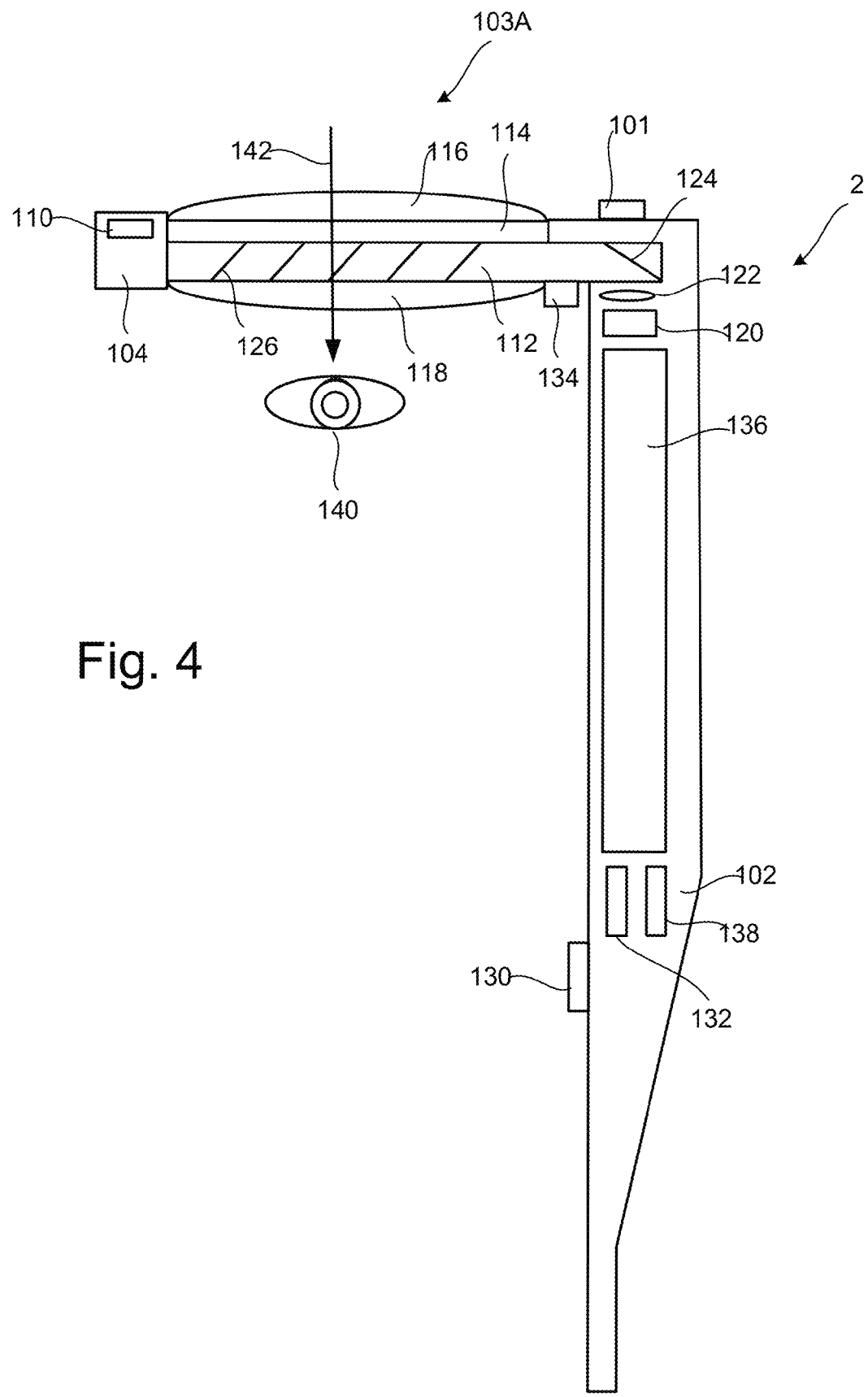
FIG. 4 is a top view of a portion of one embodiment of a HMD device.

FIG. 4 depicts a top view of a portion of one embodiment of HMD device 2, including a portion of the frame that includes temple 102 and nose bridge 104. Only the right side of HMD device 2 is depicted. Built into nose bridge 104 is a microphone 110 for recording sounds and transmitting that audio data to processing unit 4, as described below. At the front of HMD device 2 is room-facing camera 101 that can capture image data. This image data could be used to form a depth image. The room-facing camera 101 could project IR and sense reflected IR light from objects to determine depth. The room-facing video camera 101 could be an RGB camera. The images may be transmitted to processing unit 4 and/or hub computing device 12. The room-facing camera 101 faces outward and has a viewpoint similar to that of the user.

A portion of the frame of HMD device 2 will surround a display 103A (that includes one or more lenses). In order to show the components of HMD device 2, a portion of the frame surrounding the display is not depicted. In this embodiment, the display 103A includes a light guide optical element 112 (or other optical element), opacity filter 114, see-through lens 116 and see-through lens 118. In one embodiment, opacity filter 114 is behind and aligned with see-through lens 116, light guide optical element 112 is behind and aligned with opacity filter 114, and see-through lens 118 is behind and aligned with light guide optical element 112. See-through lenses 116 and 118 may be standard lenses used in eye glasses and can be made to any prescription (including no prescription). In one embodiment, see-through lenses 116 and 118 can be replaced by a variable prescription lens. In some embodiments, HMD device 2 will include only one see-through lens or no see-through lenses. In another alternative, a prescription lens can go inside light guide optical element 112. Opacity filter 114 filters out natural light (either on a per pixel basis or uniformly) to enhance the contrast of the virtual imagery. Light guide optical element 112 channels artificial light to the eye. More details of opacity filter 114 and light guide optical element 112 are provided below.

Mounted to or inside temple 102 is an image source, which (in one embodiment) includes microdisplay 120 for projecting a virtual image and lens 122 for directing images from microdisplay 120 into light guide optical element 112. In one embodiment, lens 122 is a collimating lens. A remote display device can include microdisplay 120, one or more optical components such as the lens 122 and light guide 112, and associated electronics such as a driver. Such a remote display device is associated with the HMD device, and emits light to a user's eye, where the light represents the physical objects that correspond to the electronic communications.

Control circuits 136 provide various electronics that support the other components of HMD device 2. More details of control circuits 136 are provided below with respect to FIG. 5. Inside, or mounted to temple 102, are ear phones 130, inertial sensors 132 and temperature sensor 138. In one embodiment, inertial sensors 132 include a three axis magnetometer 132A, three axis gyro 132B and three axis accelerometer 132C (See FIG. 5). The inertial sensors are for sensing position, orientation, sudden accelerations of HMD device 2. For example, the inertial sensors can be one or more sensors which are used to determine an orientation and/or location of user's head. This can be used to help determine the perspective of the user with respect to the virtual hole 3 and virtual object 5.

Microdisplay 120 projects an image through lens 122. There are different image generation technologies that can be used to implement microdisplay 120. For example, microdisplay 120 can be implemented in using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and MIRASOL® (a display technology from QUALCOMM, INC.) are all examples of reflective technologies which are efficient as most energy is reflected away from the modulated structure. Additionally, microdisplay 120 can be implemented using an emissive technology where light is generated by the display. For example, a PicoP™-display engine (available from MICROVISION, INC.) emits a laser signal with a micro mirror steering either onto a tiny screen that acts as a transmissive element or beamed directly into the eye (e.g., laser).

Light guide optical element 112 transmits light from microdisplay 120 to the eye 140 of the person wearing HMD device 2. Light guide optical element 112 also allows light from in front of the HMD device 2 to be transmitted through light guide optical element 112 to eye 140, as depicted by arrow 142, thereby allowing the person to have an actual direct view of the space in front of HMD device 2 in addition to receiving a virtual image from microdisplay 120. Thus, the walls of light guide optical element 112 are see-through. Light guide optical element 112 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar, substrate comprising light guide optical element 112 by internal reflection. After several reflections off the surfaces of the substrate, the trapped light waves reach an array of selectively reflecting surfaces 126. Note that only one of the five surfaces is labeled 126 to prevent over-crowding of the drawing.

Reflecting surfaces 126 couple the light waves incident upon those reflecting surfaces out of the substrate into the eye 140 of the user. As different light rays will travel and bounce off the inside of the substrate at different angles, the different rays will hit the various reflecting surface 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. More details of a light guide optical element can be found in U.S. Patent Application Publication 2008/0285140, Ser. No. 12/214,366, published on Nov. 20, 2008, incorporated herein by reference in its entirety. In one embodiment, each eye will have its own light guide optical element 112. When the HMD device has two light guide optical elements, each eye can have its own microdisplay 120 that can display the same image in both eyes or different images in the two eyes. In another embodiment, there can be one light guide optical element which reflects light into both eyes.

In some embodiments, the HMD has an opacity filter 114. Opacity filter 114, which is aligned with light guide optical element 112, selectively blocks natural light, either uniformly or on a per-pixel basis, from passing through light guide optical element 112. In one embodiment, the opacity filter can be a see-through LCD panel, electrochromic film, or similar device which is capable of serving as an opacity filter. Such a see-through LCD panel can be obtained by removing various layers of substrate, backlight and diffusers from a conventional LCD. The LCD panel can include one or more light-transmissive LCD chips which allow light to pass through the liquid crystal. Such chips are used in LCD projectors, for instance.

Opacity filter 114 can include a dense grid of pixels, where the light transmissivity of each pixel is individually controllable between minimum and maximum transmissivities. While a transmissivity range of 0-100% is ideal, more limited ranges are also acceptable. As an example, a monochrome LCD panel with no more than two polarizing filters is sufficient to provide an opacity range of about 50% to 90% per pixel, up to the resolution of the LCD. At the minimum of 50%, the lens will have a slightly tinted appearance, which is tolerable. 100% transmissivity represents a perfectly clear lens. An "alpha" scale can be defined from 0-100%, where 0% allows no light to pass and 100% allows all light to pass. The value of alpha can be set for each pixel by the opacity filter control circuit 224 described below. The opacity filter 114 may be set to whatever transmissivity is desired.

Figure 5:
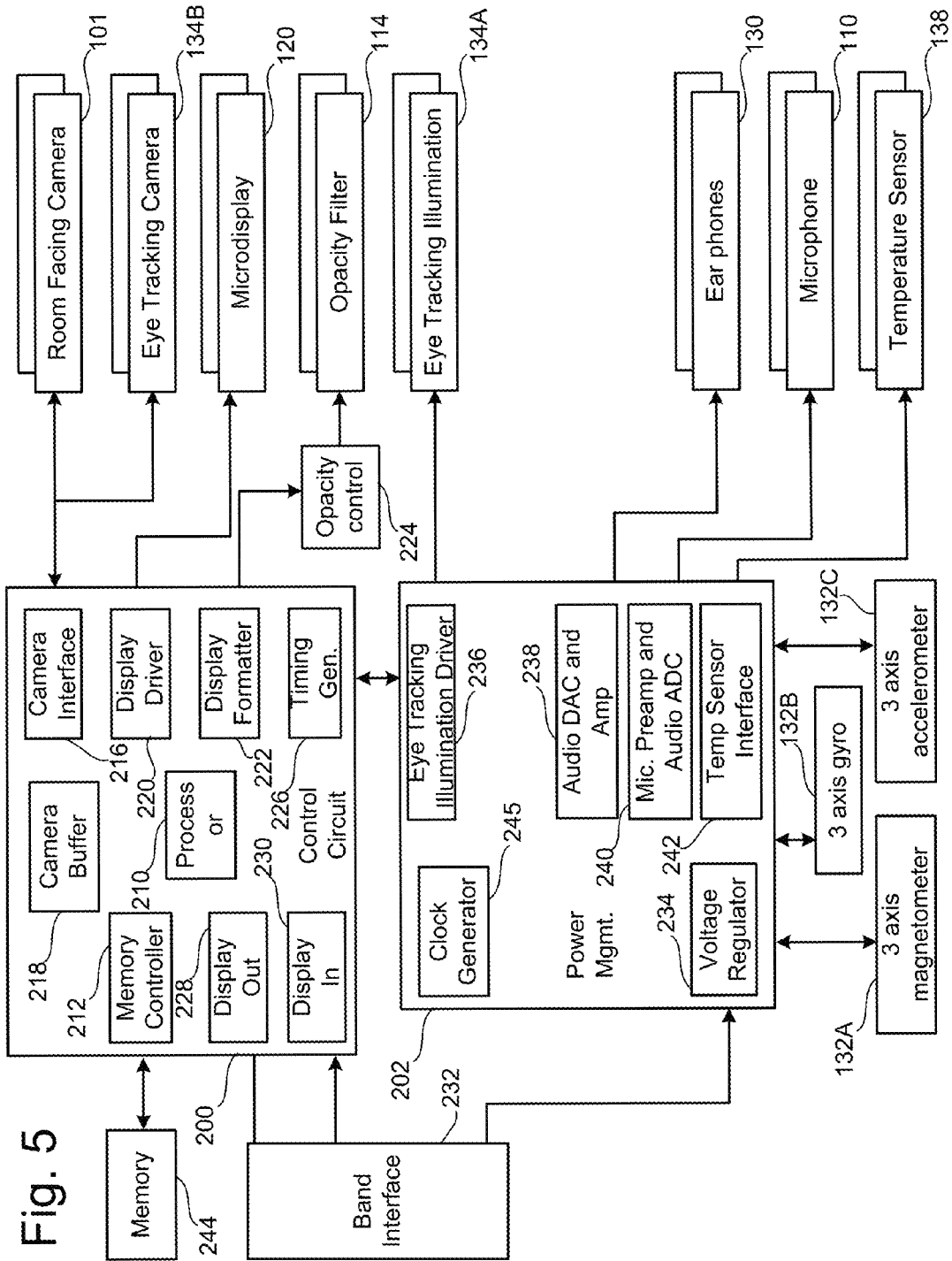
FIG. 5 is a block diagram of one embodiment of the components of a HMD device.
Figure 6:
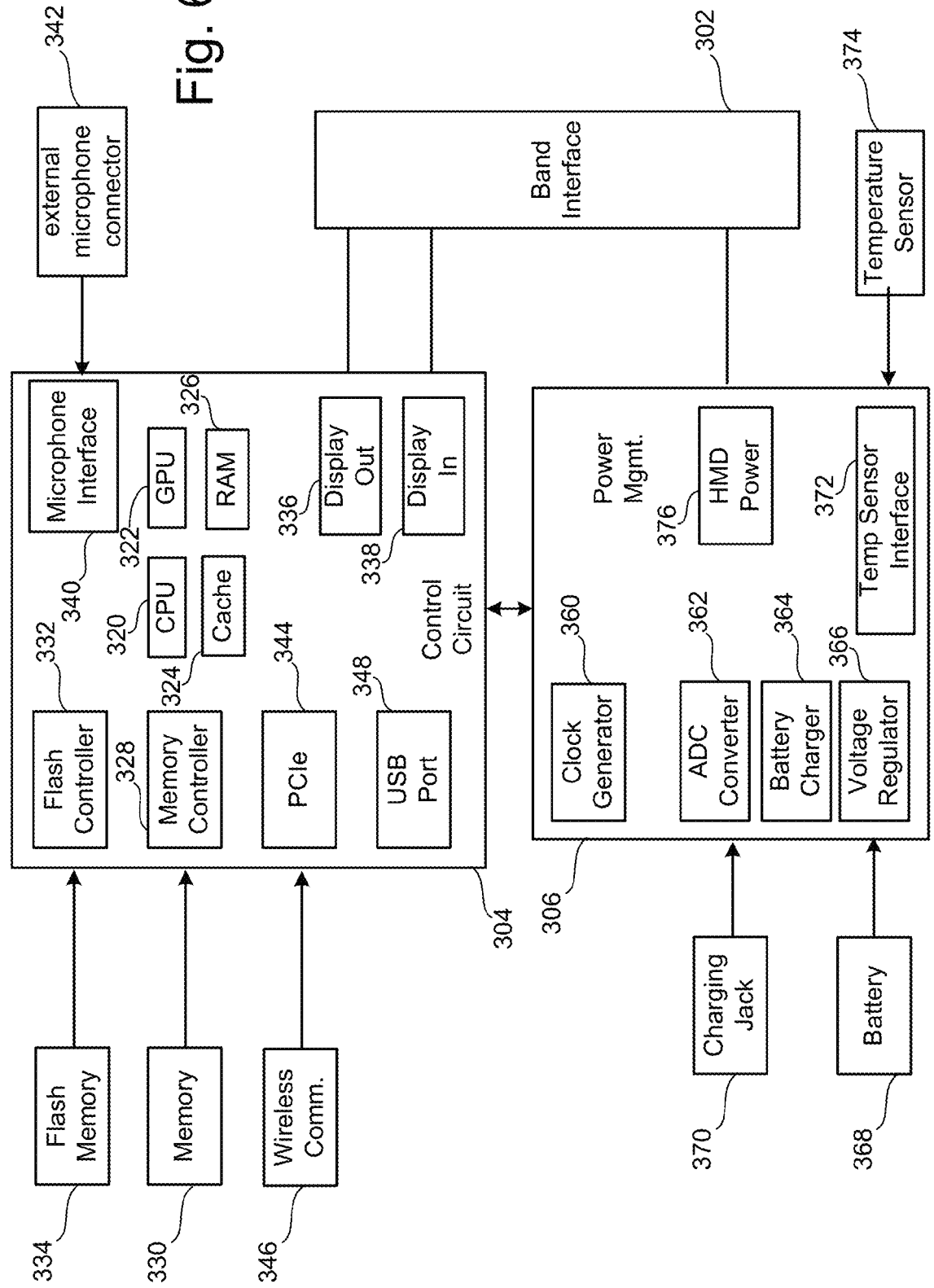
FIG. 6 is a block diagram of one embodiment of the components of a processing unit associated with a HMD device.

FIG. 5 is a block diagram depicting the various components of one embodiment of HMD device 2. FIG. 6 is a block diagram describing the various components of one embodiment of processing unit 4. Note that in some embodiments, the various components of the HMD device 2 and the processing unit 4 may be combined in a single electronic device. Additionally, the HMD device components of FIG. 5 include many sensors that track various conditions. Head-mounted display device may receive images from processing unit 4 and may provide sensor information back to processing unit 4. Processing unit 4, the components of which are depicted in FIG. 5, may receive the sensory information from HMD device 2 and also from hub computing device 12 (See FIG. 3B).

Note that some of the components of FIG. 5 (e.g., room facing camera 101, eye tracking camera 134B, microdisplay 120, opacity filter 114, eye tracking illumination 134A, earphones 130, and temperature sensor 138) are shown in shadow to indicate that there are two of each of those devices, one for the left side and one for the right side of HMD device. Regarding the room-facing camera 101, in one approach one camera is used to obtain images using visible light. In another approach, two or more cameras with a known spacing between them are used as a depth camera to also obtain depth data for objects in a room, indicating the distance from the cameras/HMD device to the object. The cameras of the HMD device can essentially duplicate the functionality of the depth camera provided by the computer hub 12.

FIG. 5 shows the control circuit 200 in communication with the power management circuit 202. Control circuit 200 includes processor 210, memory controller 212 in communication with memory 244 (e.g., DRAM), camera interface 216, camera buffer 218, display driver 220, display formatter 222, timing generator 226, display out interface 228, and display in interface 230. In one embodiment, all of components of control circuit 200 are in communication with each other via dedicated lines or one or more buses. In another embodiment, each of the components of control circuit 200 is in communication with processor 210. Camera interface 216 provides an interface to the two room facing cameras 112 and stores images received from the room facing cameras in camera buffer 218. Display driver 220 drives microdisplay 120. Display formatter 222 provides information, about the images being displayed on microdisplay 120, to opacity control circuit 224, which controls opacity filter 114. Timing generator 226 is used to provide timing data for the system. Display out interface 228 is a buffer for providing images from room facing cameras 112 to the processing unit 4. Display in 230 is a buffer for receiving images to be displayed on microdisplay 120. Display out 228 and display in 230 communicate with band interface 232 which is an interface to processing unit 4.

Power management circuit 202 includes voltage regulator 234, eye tracking illumination driver 236, audio DAC and amplifier 238, microphone preamplifier audio ADC 240, temperature sensor interface 242 and clock generator 245. Voltage regulator 234 receives power from processing unit 4 via band interface 232 and provides that power to the other components of HMD device 2. Eye tracking illumination driver 236 provides the infrared (IR) light source for eye tracking illumination 134A, as described above. Audio DAC and amplifier 238 receives the audio information from earphones 130. Microphone preamplifier and audio ADC 240 provides an interface for microphone 110. Temperature sensor interface 242 is an interface for temperature sensor 138. Power management unit 202 also provides power and receives data back from three-axis magnetometer 132A, three-axis gyroscope 132B and three axis accelerometer 132C.

FIG. 6 is a block diagram describing the various components of processing unit 4. Control circuit 304 is in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with HMD device 2 via band interface 302 and band interface 232, display in buffer 338 in communication with HMD device 2 via band interface 302 and band interface 232, microphone interface 340 in communication with an external microphone connector 342 for connecting to a microphone, PCI express interface 344 for connecting to a wireless communication device 346, and USB port(s) 348.

In one embodiment, wireless communication component 346 can include a WIFI® enabled communication device, Bluetooth communication device, infrared communication device, etc. The wireless communication component 346 is a wireless communication interface which, in one implementation, receives data in synchronism with the content displayed by the video display screen.

The USB port can be used to dock the processing unit 4 to hub computing device 12 in order to load data or software onto processing unit 4, as well as charge processing unit 4. In one embodiment, CPU 320 and GPU 322 are the main workhorses for determining where, when and how to render virtual images in the HMD.

Power management circuit 306 includes clock generator 360, analog to digital converter 362, battery charger 364, voltage regulator 366, HMD power source 376, and temperature sensor interface 372 in communication with temperature sensor 374 (located on the wrist band of processing unit 4). Analog to digital converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. HMD power source 376 provides power to the HMD device 2.

Figure 7:
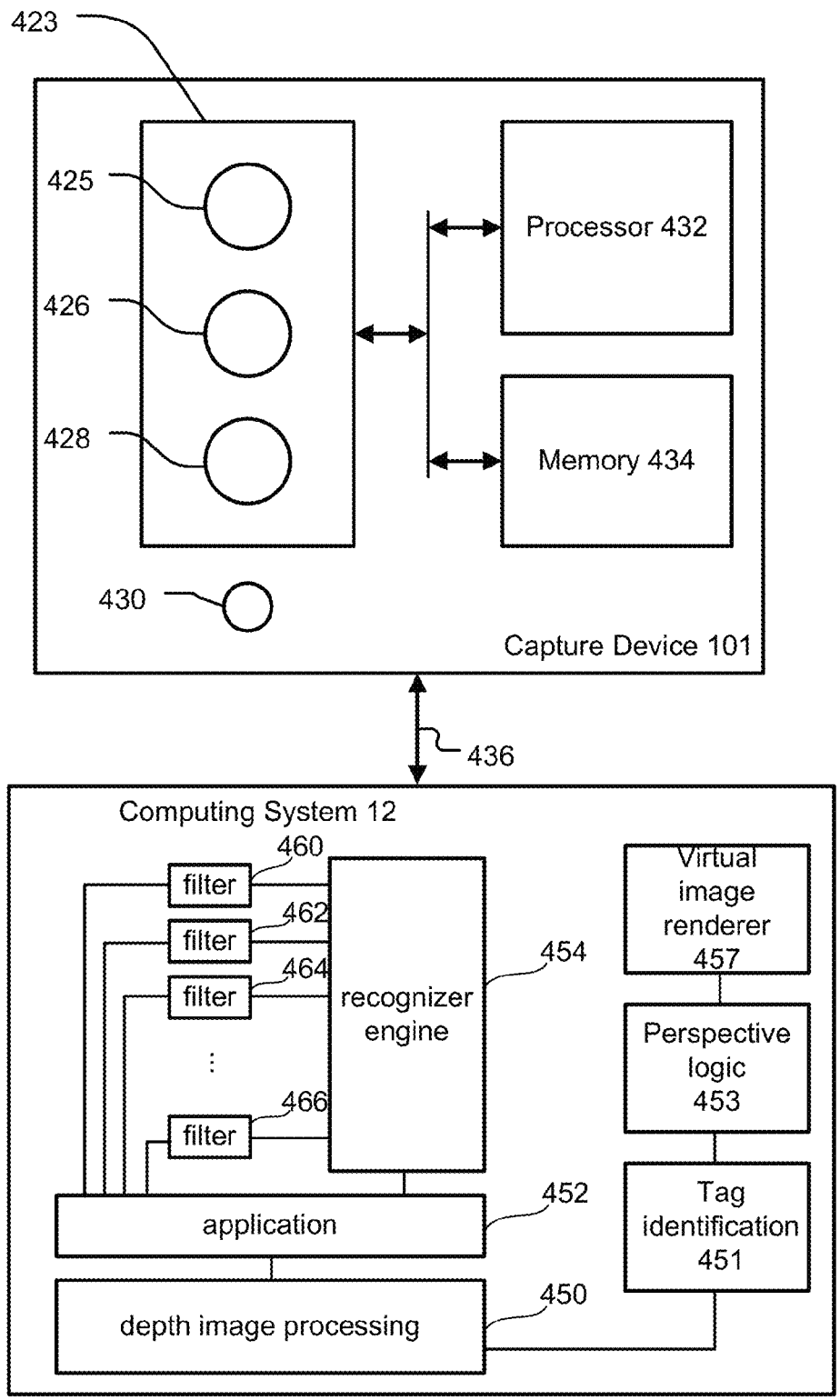
FIG. 7 is a block diagram of one embodiment of the components of a hub computing system used with a HMD device.

FIG. 7 illustrates an example embodiment of hub computing system 12 in communication with a capture device 101. The capture device 101 may be part of the HMD 2, but that is not required. According to an example embodiment, capture device 101 may be configured to capture depth information including a depth image that may include depth values via any suitable technique including, for example, time-of-flight, structured light, stereo image, or the like. According to one embodiment, the capture device 101 may organize the depth information into "Z layers," or layers that may be perpendicular to a Z axis extending from the depth camera along its line of sight.

Capture device 101 may include a camera component 423, which may be or may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

Camera component 423 may include an infrared (IR) light emitter 425, an infrared camera 426, and an RGB (visual image) camera 428 that may be used to capture the depth image of a scene. A 3-D camera is formed by the combination of the infrared emitter 425 and the infrared camera 426. For example, in time-of-flight analysis, the IR light emitter 425 of the capture device 101 may emit an infrared light onto the scene and may then use sensors (in some embodiments, including sensors not shown) to detect the backscattered light from the surface of one or more targets and objects in the scene using, for example, the 3-D camera 426 and/or the RGB camera 428. According to one embodiment, time-of-flight analysis may be used to indirectly determine a physical distance from the capture device 101 to a particular location on the targets or objects by analyzing the intensity of the reflected beam of light over time via various techniques including, for example, shuttered light pulse imaging.

In another example embodiment, capture device 101 may use a structured light to capture depth information. In such an analysis, patterned light (i.e., light displayed as a known pattern such as grid pattern, a stripe pattern, or different pattern) may be projected onto the scene via, for example, the IR light emitter 425. Upon striking the surface of one or more targets or objects in the scene, the pattern may become deformed in response. Such a deformation of the pattern may be captured by, for example, the 3-D camera 426 and/or the RGB camera 428 (and/or other sensor) and may then be analyzed to determine a physical distance from the capture device to a particular location on the targets or objects. In some implementations, the IR light component 425 is displaced from the cameras 425 and 426 so triangulation can be used to determined distance from cameras 425 and 426. In some implementations, the capture device 101 will include a dedicated IR sensor to sense the IR light, or a sensor with an IR filter.

According to another embodiment, the capture device 101 may include two or more physically separated cameras that may view a scene from different angles to obtain visual stereo data that may be resolved to generate depth information. Other types of depth image sensors can also be used to create a depth image.

The capture device 101 may further include a microphone 430, which includes a transducer or sensor that may receive and convert sound into an electrical signal. Microphone 430 may be used to receive audio signals that may also be provided by hub computing system 12.

In an example embodiment, the video capture device 101 may further include a processor 432 that may be in communication with the image camera component 423. Processor 432 may include a standardized processor, a specialized processor, a microprocessor, or the like that may execute instructions including, for example, instructions for receiving a depth image, generating the appropriate data format (e.g., frame) and transmitting the data to hub computing system 12.

Capture device 101 may further include a memory 434 that may store the instructions that are executed by processor 432, images or frames of images captured by the 3-D camera and/or RGB camera, or any other suitable information, images, or the like. According to an example embodiment, memory 434 may include random access memory (RAM), read only memory (ROM), cache, flash memory, a hard disk, or any other suitable storage component. As shown in FIG. 7, in one embodiment, memory 434 may be a separate component in communication with the image capture component 423 and processor 432. According to another embodiment, the memory 434 may be integrated into processor 432 and/or the image capture component 423.

Capture device 101 is in communication with hub computing system 12 via a communication link 436. The communication link 436 may be a wired connection including, for example, a USB connection, a FireWire connection, an Ethernet cable connection, or the like and/or a wireless connection such as a wireless 802.11b, g, a, or n connection. According to one embodiment, hub computing system 12 may provide a clock to capture device 101 that may be used to determine when to capture, for example, a scene via the communication link 436. Additionally, the video capture device 101 provides the depth information and visual (e.g., RGB or other color) images captured by, for example, the 3-D camera 426 and/or the RGB camera 428 to hub computing system 12 via the communication link 436. In one embodiment, the depth images and visual images are transmitted at 30 frames per second; however, other frame rates can be used.

Hub computing system 12 includes depth image processing module 450. Depth image processing may be used to determine depth to various objects in the field of view (FOV).

Recognizer engine 454 is associated with a collection of filters 460, 462, 464, . . . , 466 each comprising information concerning a gesture, action or condition that may be performed by any person or object detectable by capture device 101. For example, the data from capture device 101 may be processed by filters 460, 462, 464, . . . , 466 to track the user's interactions with virtual objects 5.

The computing system 12 also has tag identification 451, perspective logic 453, and virtual image renderer 457. Tag identification 451 is able to identify physical tags 11 using sense data. This could be, but is not limited to depth data. Perspective logic 453 is able to determine the perspective of the user with respect to were the virtual object 5 and virtual hole 3 are to appear in the real world. Perspective logic 453 could use depth data, RGB data, and data from various inertial sensors 132 such as a three axis magnetometer 132A, three axis gyro 132B and three axis accelerometer 132C. Virtual image renderer 457 is able to render the virtual object 5 in the virtual hole 3 from the perspective of the user. In some embodiments, the virtual image renderer 457 responds to commands or instructions from an application 452.

Capture device 101 provides RGB images (or visual images in other formats or color spaces) and depth images to hub computing system 12. The depth image may be a plurality of observed pixels where each observed pixel has an observed depth value. For example, the depth image may include a two-dimensional (2-D) pixel area of the captured scene where each pixel in the 2-D pixel area may have a depth value such as distance of an object in the captured scene from the capture device. Hub computing system 12 will use the RGB images and depth images to track a user's or object's movements. For example, the system may track a skeleton of a person using the depth images. There are many methods that can be used to track the skeleton of a person using depth images.

More information about recognizer engine 454 can be found in U.S. Patent Publication 2010/0199230, "Gesture Recognizer System Architecture," filed on Apr. 13, 2009, incorporated herein by reference in its entirety. More information about recognizing gestures can be found in U.S. Patent Publication 2010/0194762, "Standard Gestures," published Aug. 5, 2010, and U.S. Patent Publication 2010/0306713, "Gesture Tool" filed on May 29, 2009, both of which are incorporated herein by reference in their entirety.

Figure 8:
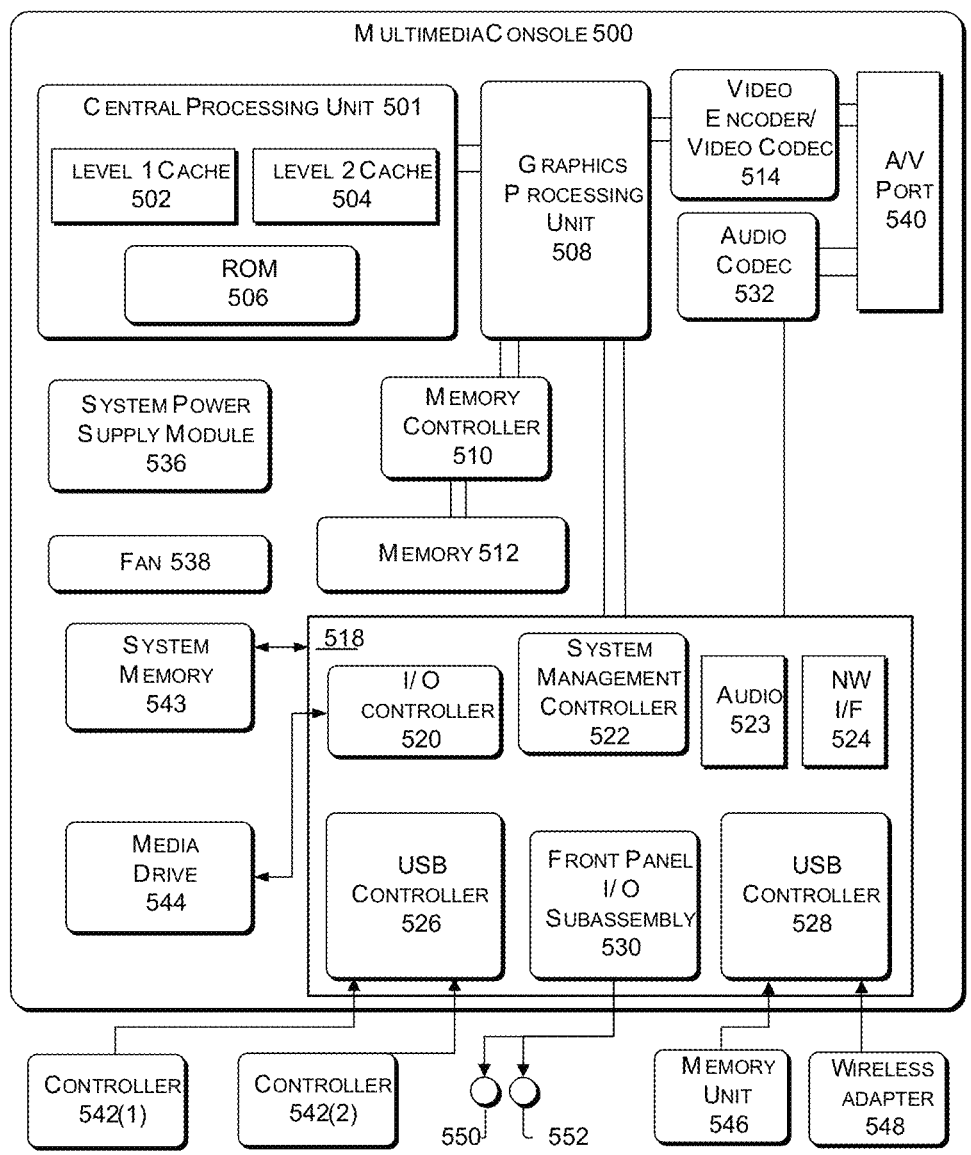
FIG. 8 is a block diagram of one embodiment of a computing system that can be used to implement the hub computing system described herein.

FIG. 8 illustrates an example embodiment of a computing system that may be used to implement hub computing system 12. As shown in FIG. 8, the multimedia console 500 has a central processing unit (CPU) 501 having a level 1 cache 502, a level 2 cache 504, and a flash ROM (Read Only Memory) 506. The level 1 cache 502 and a level 2 cache 504 temporarily store data and hence reduce the number of memory access cycles, thereby improving processing speed and throughput. CPU 501 may be provided having more than one core, and thus, additional level 1 and level 2 caches 502 and 504. The flash ROM 506 may store executable code that is loaded during an initial phase of a boot process when the multimedia console 500 is powered on.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM (Random Access Memory).

The multimedia console 500 includes an I/O controller 520, a system management controller 522, an audio processing unit 523, a network interface 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 548, and an external memory device 546 (e.g., flash memory, external CD/DVD ROM drive, removable media, etc.). The network interface 524 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, Blu-Ray drive, hard disk drive, or other removable media drive, etc. The media drive 544 may be internal or external to the multimedia console 500. Application data may be accessed via the media drive 544 for execution, playback, etc. by the multimedia console 500. The media drive 544 is connected to the I/O controller 520 via a bus, such as a Serial ATA bus or other high speed connection (e.g., IEEE 1394 serial bus interface).

The system management controller 522 provides a variety of service functions related to assuring availability of the multimedia console 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the A/V port 540 for reproduction by an external audio user or device having audio capabilities.

The front panel I/O subassembly 530 supports the functionality of the power button 550 and the eject button 552, as well as any LEDs (light emitting diodes) or other indicators exposed on the outer surface of the multimedia console 100. A system power supply module 536 provides power to the components of the multimedia console 100. A fan 538 cools the circuitry within the multimedia console 500.

The CPU 501, GPU 508, memory controller 510, and various other components within the multimedia console 500 are interconnected via one or more buses, including serial and parallel buses, a memory bus, a peripheral bus, and a processor or local bus using any of a variety of bus architectures. Such architectures can include a Peripheral Component Interconnects (PCI) bus, PCI-Express bus, etc.

When the multimedia console 500 is powered on, application data may be loaded from the system memory 543 into memory 512 and/or caches 502, 504 and executed on the CPU 501. The application may present a graphical user interface that provides a consistent user experience when navigating to different media types available on the multimedia console 500. In operation, applications and/or other media contained within the media drive 544 may be launched or played from the media drive 544 to provide additional functionalities to the multimedia console 500.

The multimedia console 500 may be operated as a standalone system by simply connecting the system to a television or other display. In this standalone mode, the multimedia console 500 allows one or more users to interact with the system, watch movies, or listen to music. However, with the integration of broadband connectivity made available through the network interface 524 or the wireless adapter 548, the multimedia console 500 may further be operated as a participant in a larger network community. Additionally, multimedia console 500 can communicate with processing unit 4 via wireless adaptor 548.

When the multimedia console 500 is powered ON, a set amount of hardware resources are reserved for system use by the multimedia console operating system. These resources may include a reservation of memory, CPU and GPU cycle, networking bandwidth, etc. Because these resources are reserved at system boot time, the reserved resources do not exist from the application's view. In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop ups) are displayed by using a GPU interrupt to schedule code to render a popup into an overlay. The amount of memory used for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

After multimedia console 500 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 501 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager controls the gaming application audio level (e.g., mute, attenuate) when system applications are active.

Optional input devices (e.g., controllers 542(1) and 542(2)) are shared by gaming applications and system applications. The input devices are not reserved resources, but are to be switched between system applications and the gaming application such that each will have a focus of the device. The application manager preferably controls the switching of input stream, without knowing the gaming application's knowledge and a driver maintains state information regarding focus switches. In other embodiments, hub computing system 12 can be implemented using other hardware architectures. No one hardware architecture is required.

Figure 9:
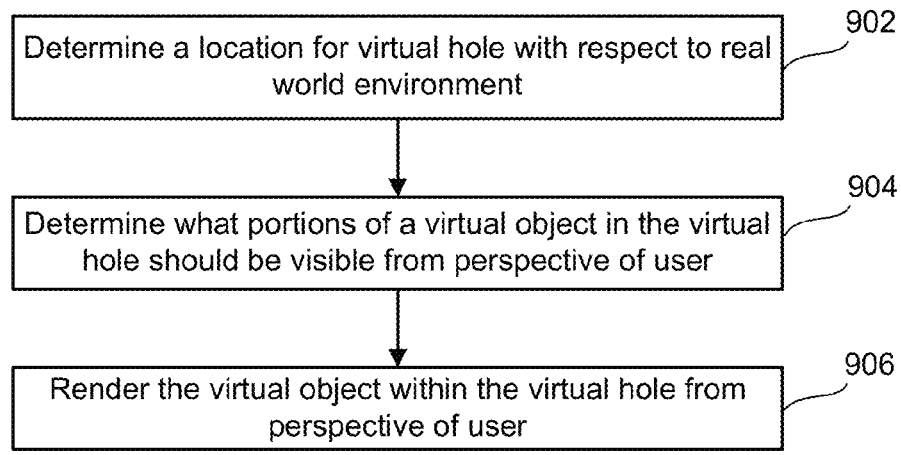
FIG. 9 is a flowchart of one embodiment of a process of rendering a virtual object in a virtual hole.

FIG. 9 is a flowchart of one embodiment of a process 900 of rendering a virtual object 5 in a virtual hole 3. In step 902, a location for a virtual hole 3 with respect to the real world environment is determined. Also, a location for a virtual object 5 within the virtual hole 3 may be determined.

In one embodiment, step 902 includes identifying a physical tag 11 in the real world environment. The physical tag 11 could be on or in a real world object. In one embodiment, step 902 includes accessing image data, and identifying a region indicated by a user in the image data. For example, a user can point out a region that should be used for the virtual hole 3.

In step 904, a determination is made as to which portions of a virtual object 5 should be visible to the user from their perspective. Step 904 may include determining the location of the user's head and/or eyes relative to the location of the physical tag 11 or other marker for the location of the virtual hole 3. Various sensors may be used for this step.

In step 906, the virtual object 5 is rendered within the virtual hole 3 in the display device 2 from the perspective of the user 7 to present the illusion that the virtual object 5 is within the virtual hole 4. In one embodiment, the virtual hole 3 is rendered in the display 2 to appear to be a cutout in a real world object. For example, the virtual hole 3 may be rendered to appear to be a cutout in a book or a table. The virtual object 5 may be made to appear as being just below the surface of the real world object.

In one embodiment, the virtual hole 3 serves as a virtual container. The virtual object 5 may appear to be located within the virtual container. In one embodiment, virtual objects 5 are placed into or removed from the virtual container by the user 7. The system 111 is able to track user movements with a camera to provide for this. In one embodiment, a software application determines when virtual objects 5 should be placed into or removed from the virtual container.

Figure 10A:
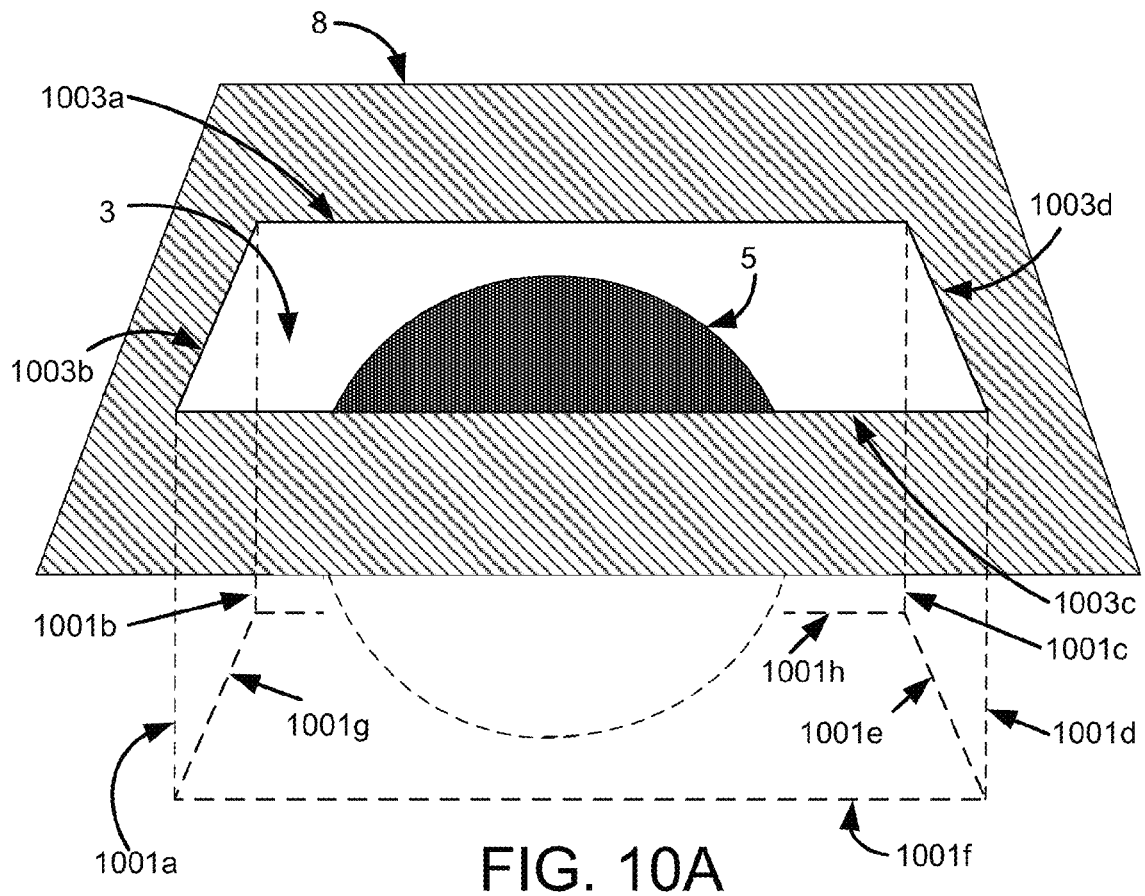
FIG. 10A is a diagram of one embodiment of a virtual object rendered in a virtual hole.

FIG. 10A is a diagram of one embodiment of a virtual object 5 rendered in a virtual hole 3. That it, to the user wearing a mixed reality display device 2, the virtual object 5 appears to be in the virtual hole 3. The virtual hole 3 may appear to be a hole or cutout in a real world object. Dashed lines represent elements that are not actually seen by the user wearing the display 2. In this embodiment, the virtual hole 3 is shown as a virtual container that contains the virtual object 5. The virtual hole 3 has a cutout that is defined in the plane of the table 8, in this embodiment. The cutout is represented by the shape formed by lines 1003a-1003d. The cutout may also be referred to as a virtual window or a virtual opening. The dotted lines 1001a-1001h show the shape of the virtual container below the table 8. Note that the virtual container is not typically displayed to the user. Rather, the user sees the top portion of the virtual object 5.

In one embodiment, the system 111 stores data that represents the shape of the virtual container to aid in rendering the virtual object 5. The system 111 may, in effect, determine that the virtual container will block the virtual object 5 from the user's view. However, as noted, the virtual container itself does not need to be rendered in the display 2.

Figure 10B:
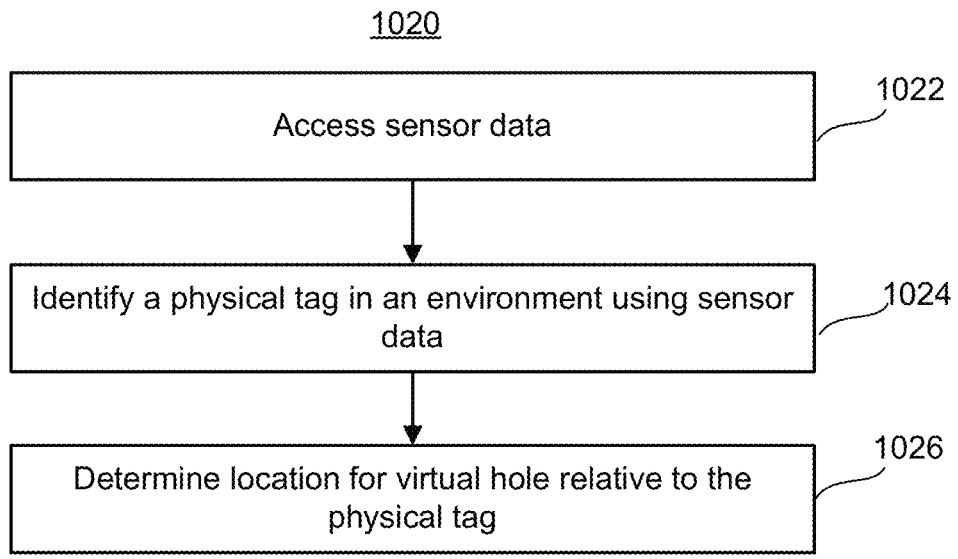
FIG. 10B is a flowchart of one embodiment of a process for determining a location for a virtual hole.

FIG. 10B is a flowchart of one embodiment of a process 1020 for determining a location for a virtual hole 3. This process 1020 is one embodiment of step 902 from FIG. 9. In this process 1020, the location is based on a physical tag 11. In step 1022, sensor data that will be used to identify the tag 11 is accessed. Any type of sensor data may be used. Examples include, but are not limited to, IR data, RGB data, RF data.

In step 1024, using the sensor data, a physical tag 11 is identified in a real world environment. The tag 11 may be in or on a real world object. The physical tag 11 may be any type of marker that can be identified using the HMD 2. A marker may be any text, symbol, image, etc. that is able to be uniquely identified. The marker could be visible to the human eye, as in text or an image. However, the marker might not be visible to the human eye. For example, the markers could be infrared (IR) retro-reflective markers. As one further possibility, the tag 11 might be an RFID tag.

In step 1026, a location for the virtual hole 3 relative to the tag 11 is determined Step 1026 may include determining a plane for the opening of the virtual hole 3. Step 1026 may also include determining an initial geometric shape for the opening of the virtual hole 3. However, later processing steps may refine the shape of the opening. For example, the opening may be given a cloud like shape. Further examples are discussed below.

In one embodiment, the virtual hole 3 and physical tag 11 are more or less co-located. For example, the virtual hole 3 could have about the same dimension and location as the tag 11. Even if the virtual hole 3 is in about the same location as the tag 11 it is not required to have the same size and/or shape as the tag 11. As one example, the tag 11 could be rectangular, whereas the virtual hole 3 is shaped like a cloud.

Figure 10D:
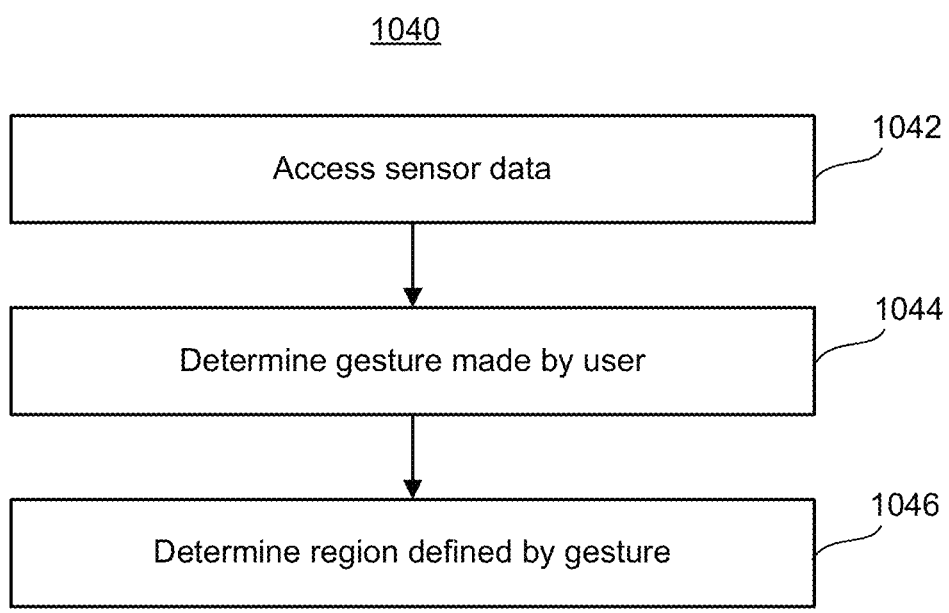
FIG. 10D is a flowchart of one embodiment of a process for determining a location for a virtual hole.
Figure 10C:
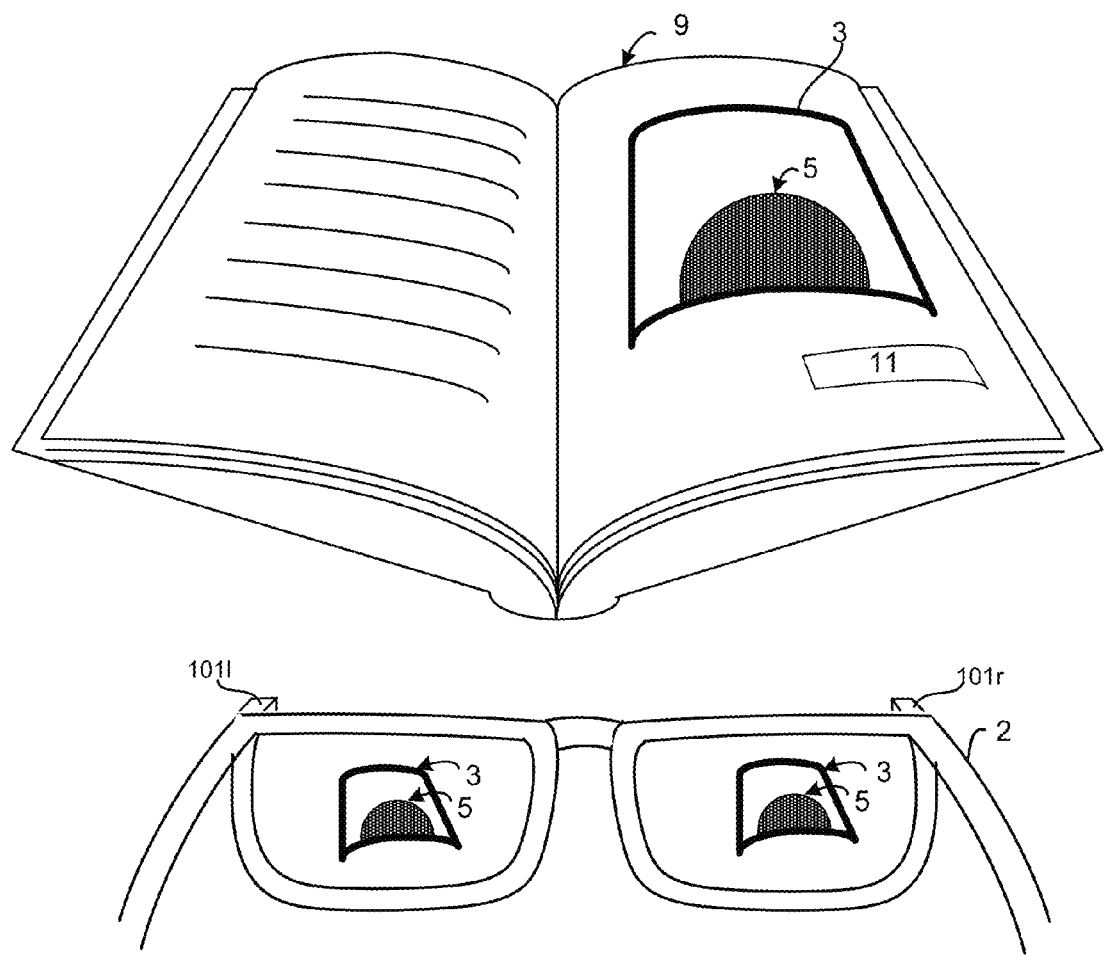
FIG. 10C shows one example in which the physical tag and virtual hole are located in different physical locations.

Also, it is not required that the virtual hole 3 is located in the same physical position as the tag 11. As one example, if the physical tag 11 is sitting on a table in the x-y plane, the virtual hole 3 could be located in the x-y plane remotely from the physical tag 11. FIG. 10C shows one example in which the physical tag 11 and virtual hole 3 are located in different physical locations. In this example, the physical tag 11 might not be visible to the user, as in an IR retro-reflective marker. In this example, the physical tag 11 and virtual hole 3 are on the same surface, that being the surface of the page of the book 9.

In some embodiments, the physical tag 11 resides on a surface. However, the opening of the virtual hole 3 could be on a different surface from the physical tag 11. As one example, the physical tag 11 could be on page 9 of the book, but the opening on page 10. As another example, the physical tag 11 could be in the book 9, but the opening for the virtual hole 3 could be on the table.

In one embodiment, the system 111 verifies whether the location for the opening is suitable. For example, having the opening on a table may be suitable. However, if the book is resting on a person's lap, then having the opening outside the book may not be a suitable choice. The system 111 uses machine vision in one embodiment to determine whether the surface for the opening is suitable when the surface is something other than the book 9.

In some embodiments, the system 111 defines a plane for the physical tag 11. The opening of the virtual hole 3 could be in a different plane from the physical tag 11. The plane of the virtual hole 3 could be above or below the plane of the physical tag 11. The plane for the opening of the virtual hole 3 does not need to be parallel to the plane of the physical tag 11.

Note that it is not required that the location for the virtual hole 3 be determined based on the location of a physical tag 11 or marker. In one embodiment, the user makes a gesture to show the desired location of the virtual hole 3. FIG. 10D is a flowchart of one embodiment of a process 1040 for determining a location for a virtual hole 3. This process 1040 is one embodiment of step 902 from FIG. 9. In step 1042, sensor data that will be used to track the user's gestures is accessed. The sensor data could be camera data such as IR or RGB data. In one embodiment, the sensor data includes depth information.

In step 1044, using the sensor data, a gesture made by the user is identified. As one example, the user traces out an outline of a virtual hole with their fingertip. In one embodiment, the system 111 uses skeletal tracking to identify the user's hands and fingers. The recognizer engine (FIG. 7, 454) may be used for this. Skeletal tracking may be performed using a depth map generated from a depth camera. Further details of skeletal tracking and detecting gestures are discussed U.S. Patent Publication 2010/0199230, U.S. Patent Publication 2010/0194762, and U.S. Patent Publication 2010/0306713, which were previously incorporated herein by reference.

In step 1046, a location for the virtual hole 3 relative to the user gesture is determined Step 1046 may include determining a plane for the opening of the virtual hole 3. Step 1046 may also include determining an initial geometric shape for the opening of the virtual hole 3. However, later processing steps may refine the shape of the opening.

In one embodiment, both the physical tag 11 and a user gesture are used to determine the location of the virtual hole 3. This may allow the user to have the virtual hole 3 located at an offset from the physical tag 11. For example, if the user does not make a gesture to relocate the virtual hole 3, then the system locates the virtual hole 3 based on the location of the physical tag 11. However, if the user does make some gesture, such as tracing an outline of a virtual hole, then the system locates the virtual hole based on where the user drew the outline. Note that this may involve identifying the tag 11 and the user relative to a coordinate system of the environment.

Figure 11:
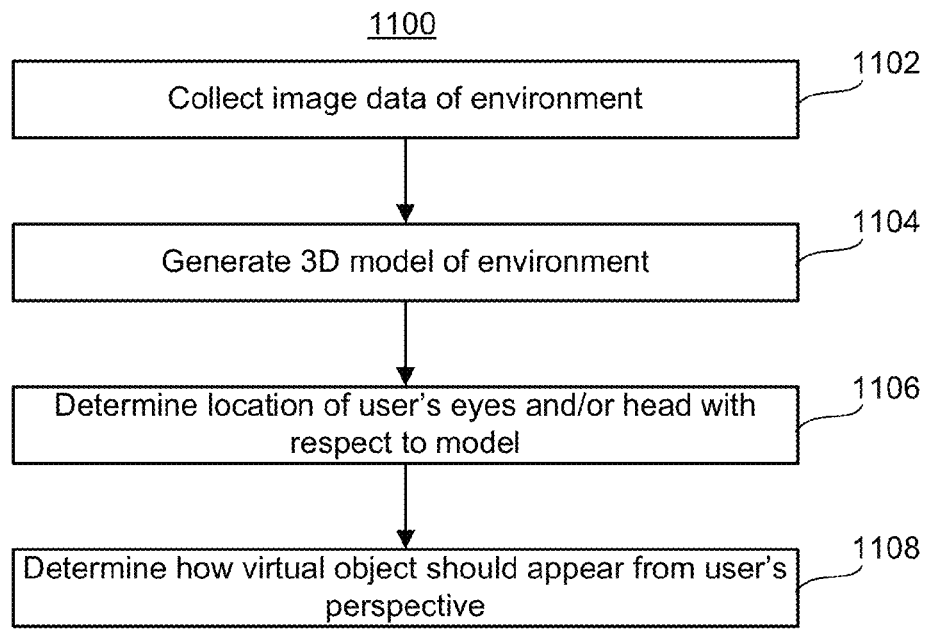
FIG. 11 is a flowchart of one embodiment of a process of determining how the virtual object should appear in the virtual hole from the perspective of the user.

FIG. 11 is a flowchart of one embodiment of a process 1100 of determining how the virtual object 5 should appear in the virtual hole 3 from the perspective of the user. Process 1100 is one embodiment of step 904 from FIG. 9. In step 1102, image data of the real world environment is collected. The image data may include IR and RGB data, as examples. The image data could include a depth map.

In step 1104, a model of the 3D environment is built based on the image data. For example, a model of a table 8 is built such that the system 111 is able to determine where to render objects with respect to the table 8. In one embodiment, hub computing system 12 receives one or more depth images for multiple perspectives. For example, hub computing device 12 can obtain depth images from multiple depth cameras or multiple depth images from the same camera by pointing the camera in different directions or using a depth camera with a lens that allows a full view of the environment or space for which a model will be built. The depth data from the various depth images may be combined based on a common coordinate system 111. For example, if this system 111 receives depth images from multiple cameras, the system 111 will correlate the two images to have a common coordinate system 111 (e.g., line up the images). In one embodiment, a volumetric description of the space is created using the depth data. Note that in some implementations, a three-dimensional model of the user's environment is not required.

In step 1106, the location of the user's head and/or eyes is determined. The sensor technologies embedded in one embodiment of the head mounted display 2 including the accelerometer, magnetometer and gyroscope, or other sensor technologies may be used to identify user position and orientation in an environment. In one embodiment, processing unit 4 will access the latest position and orientation information received from the hub. Processing unit 4 may periodically receive updated position and orientation information from hub computing device 12. In one embodiment, processing unit 4 will access data from three axis gyro 132B, three axis accelerometer 132C, and three axis magnetometer 132A. Processing unit 4 may refine (or otherwise update), the position and orientation data from hub computing device 12 with the data from the gyro, accelerometer and magnetometer. Given the sensors available from the head mounted display, inertial sensing uses inertial measurements from accelerometers and gyroscopes may be used.

Step 1106 may also include tracking the eye gaze of the user. However, eye tracking is not necessarily needed to determine how the virtual object 5 should appear from the perspective of the user. Rather, the perspective may be determined based on the location of the display device 2 relative to the location of where the virtual hole 3 is apparently being rendered. By apparently being rendered it is meant that the virtual object 5 and virtual hole 3 should appear to be at some defined location in the real world, which may be correlated to the model from step 1104.

The processing steps of FIG. 11 can be performed continuously during operation of the system 111 such that the user's perspective is continuously updated as the user moves his or her head.

In step 1108, a determination is made as to how the virtual object 5 should appear in the virtual hole 3 from the user's perspective. In one embodiment, the geometry of the opening of the virtual hole 3 and the location of the virtual object 5 within the virtual hole 3 are defined with respect to the coordinate system of the model of the environment. Thus, from the location information of the user's head and/or eyes, the perspective may be determined.

Note that other techniques may be used to determine how the virtual object 5 should appear to the perspective of the user. Note that it is not required that a model of the real world environment be built to make this determination.

Figure 12:
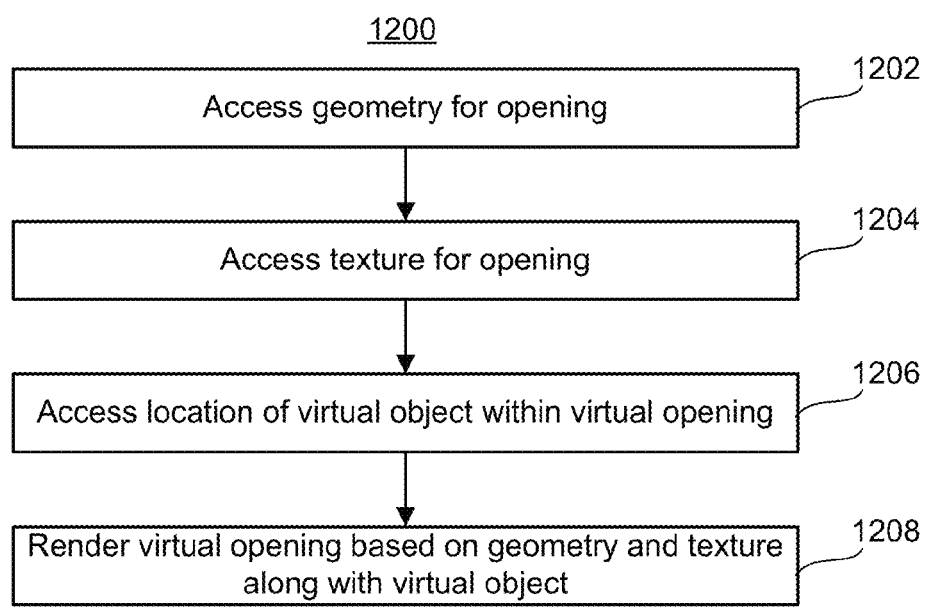
FIG. 12 is a flowchart of one embodiment of a process of rendering a virtual object within a virtual hole from the perspective of a user wearing an HMD.

FIG. 12 is a flowchart of one embodiment of a process 1200 of rendering a virtual object 5 within a virtual hole 3 from the perspective of a user 7 wearing an HMD 2. Process 1200 is one embodiment of step 906 from FIG. 9. In step 1202, the geometry of the virtual opening is accessed. Referring back to FIG. 10A, this may include accessing geometry of the opening as defined by lines 1003*a*-1003*d*. This may also include accessing a definition of a plane for the opening. Furthermore, step 1202 may include accessing data regarding one or more "virtual containers" as defined by, for example, lines 1001*a*-1001*h*. The size of a virtual container may be dynamic. In one embodiment, the virtual containers serve to occlude objects hidden in the hole.

Figure 13A:
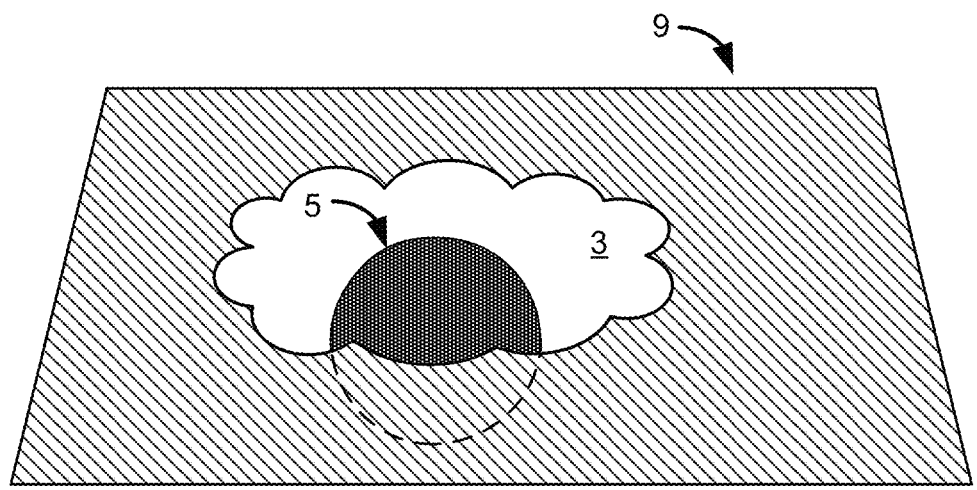
FIG. 13A shows one example in which the virtual hole has the shape of a cloud.

In step 1204, a texture for the virtual hole 3 is accessed. As discussed above, the virtual hole could have any number of interesting shapes, sizes, and visual properties. FIG. 13A shows one example in which the virtual hole 3 has the shape of a cloud. This cloud shape could be rendered by applying a texture to a more generic shape such as the example of FIG. 2A, in which the opening to the virtual hole 3 is rectangular. Note that any number of different textures can be applied, and may be selected depending on the application. As another example, the virtual hole 3 could have its edges seem to resemble blades of grass.

Figure 13B:
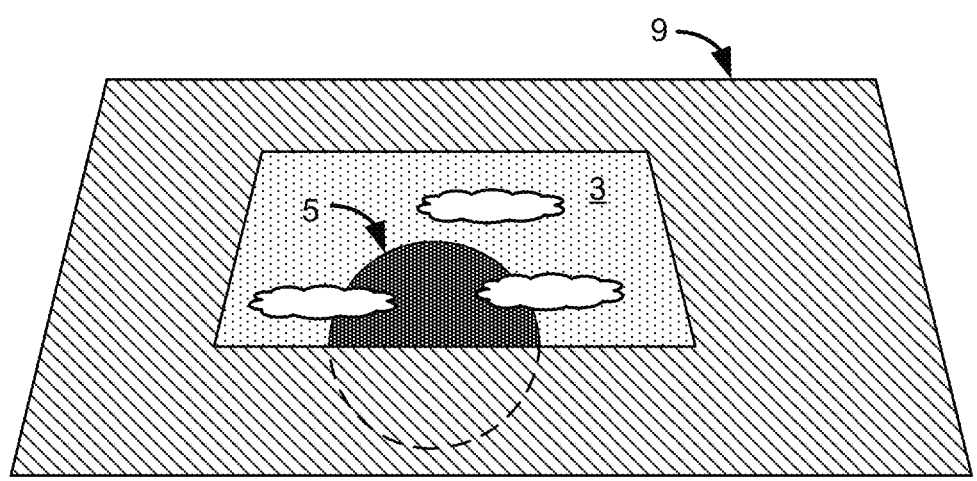
FIG. 13B depicts another example of how a texture can be used to create an interesting virtual hole.

FIG. 13B depicts another example of how a texture can be used to create an interesting virtual hole 3. In this example, the virtual hole 3 includes a sky that is transparent to allow the user to see the virtual object 5. However, the clouds are opaque, such that they occlude the user's view of the virtual object 5. Therefore, note that textures could be applied to the boundaries of the opening, as in FIG. 13A or anywhere in the opening, as in FIG. 13B, as two examples. Another example of using a texture is to render rocks, dirt, grass, etc. around the edges of the opening. In one embodiment, the boundaries of the physical tag 11 are camouflaged by the texture, which delimits the edge of the virtual hole 3.

Figure 14:
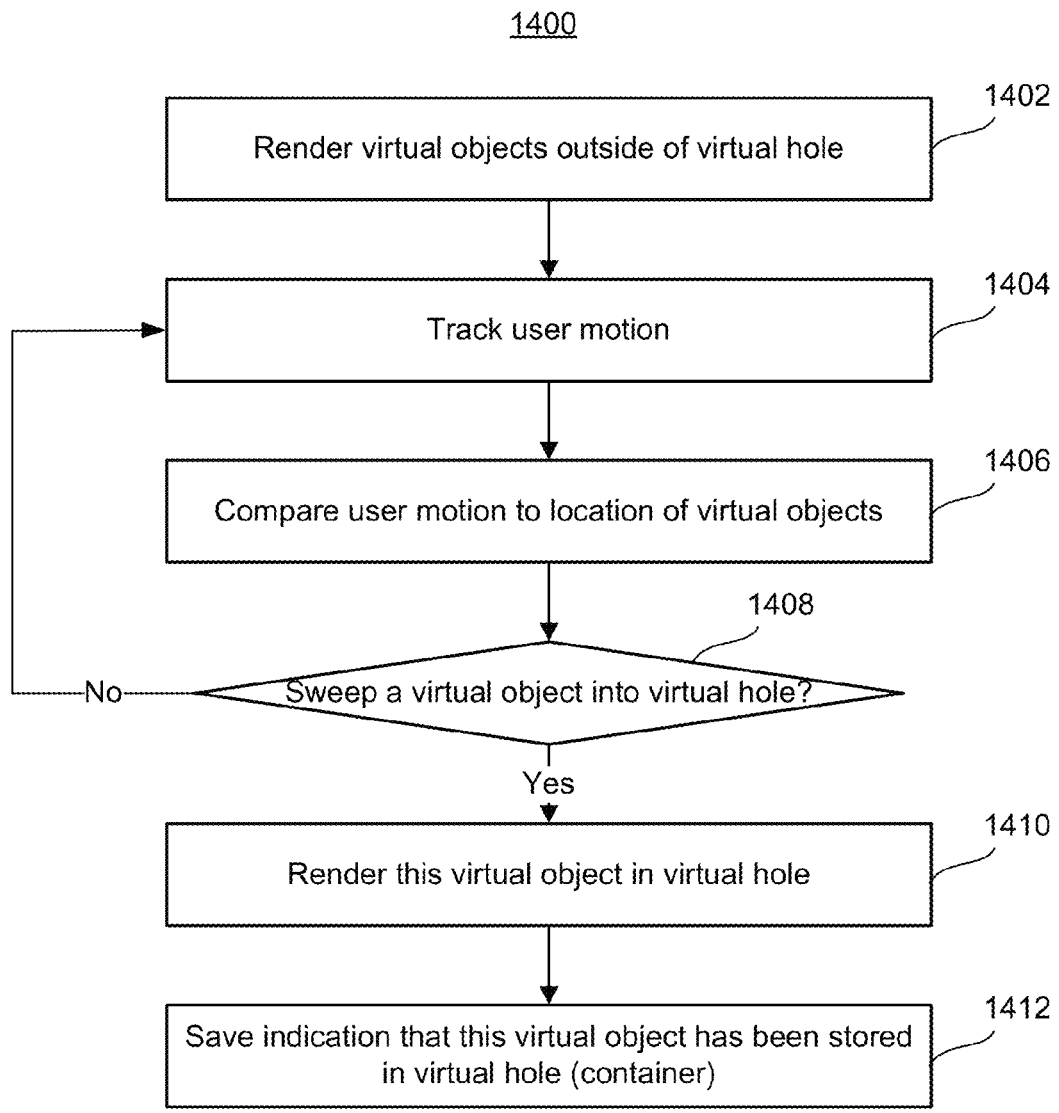
FIG. 14 is a flowchart of one embodiment of a process for using a virtual hole for storage.

Continuing with the discussion of process 1200, in step 1206 a location of the virtual object 5 within the virtual hole 3 is accessed. In step 1208, the virtual hole 3 is rendered in the HMD 2 with the virtual object 5 therein. In one embodiment, the virtual hole 3 is used as a type of storage for data associated with virtual objects. FIG. 14 is a flowchart of one embodiment of a process 1400 for using a virtual hole 3 for storage. In step 1402, one or more virtual objects 5 are rendered outside of the virtual hole 3. FIGS. 15A and 15B show one example in which a virtual object 5 is being rendered on the top of a table 8. FIG. 15A shows a view from the perspective of a user sitting at the table 8 such that the user 7 can see partly into the virtual hole 3. FIG. 15B shows a side view perspective in which the virtual object 5 is being rendered on the surface of the table 8. The edge of the physical tag 11 could possibly be observable to the user from this perspective.

In step 1404, the user's motions are tracked. In one embodiment, skeletal tracking is used. In step 1406, the user's motions are compared to the location of the virtual object(s) 5. In step 1408, the system 111 determines whether the user is or has swept a virtual object 5 into the virtual hole 3. If not, the system continues to track in step 1404.

If the user sweeps the virtual object 5 into the virtual hole 3, then the system will render the virtual object 5 as appearing in the virtual hole 3, in step 1410. FIGS. 2A and 2B show examples from two different perspectives.

In step 1412, the system 111 saves an indicator that this virtual object 5 has been stored in the virtual hole 3. Note that there may be some data associated with the virtual object 5. Thus, the system 111 may store an indication that this data was stored.

As one example of process 1400, the system 111 might initially render a number of letters or post cards on the surface of the table. If the user sweeps a letter into the virtual hole 3 then the system 111 may note that this letter has been saved. The next time that the user enters this particular application, that letter may appear in the virtual hole 3 having been saved.

Figure 16:
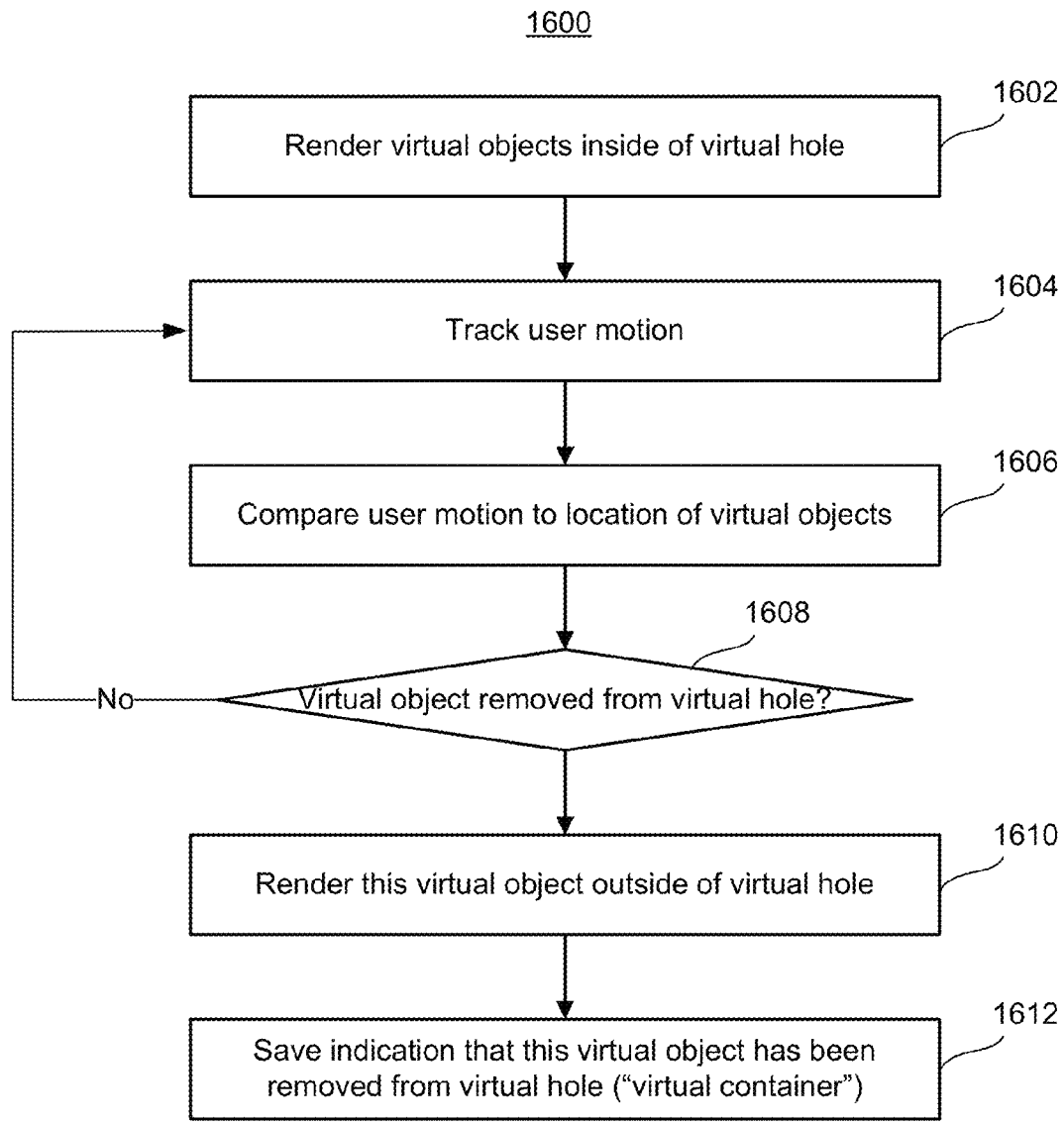
FIG. 16 is a flowchart of one embodiment of a process for retrieving stored data from a virtual hole.

FIG. 16 is a flowchart of one embodiment of a process 1600 for retrieving stored data from a virtual hole 3. This process 1600 may be used in conjunction with process 1400. In step 1602, one or more virtual objects 5 are rendered inside of the virtual hole 3. In step 1604, the user's motions are tracked. In one embodiment, skeletal tracking is used. In step 1606, the user's motions are compared to the location of the virtual object(s) 5. In step 1608, the system 111 determines whether the user has removed a virtual object 5 from the virtual hole 3. If not, the system 111 continues to track in step 1604.

If the user removes a virtual object 5 from the virtual hole 3, then the system 111 will render the virtual object 5 as appearing outside the virtual hole 2, in step 1610. FIGS. 15A and 15B show examples from two different perspectives.

In step 1612, the system 111 saves an indication that this virtual object 5 has been removed from the virtual hole 3. Note that there may be some data associated with the virtual object 5. Thus, the system 111 may change the state of the data to reflect the removal of the virtual object 5 from the virtual hole 3.

Figure 17A:
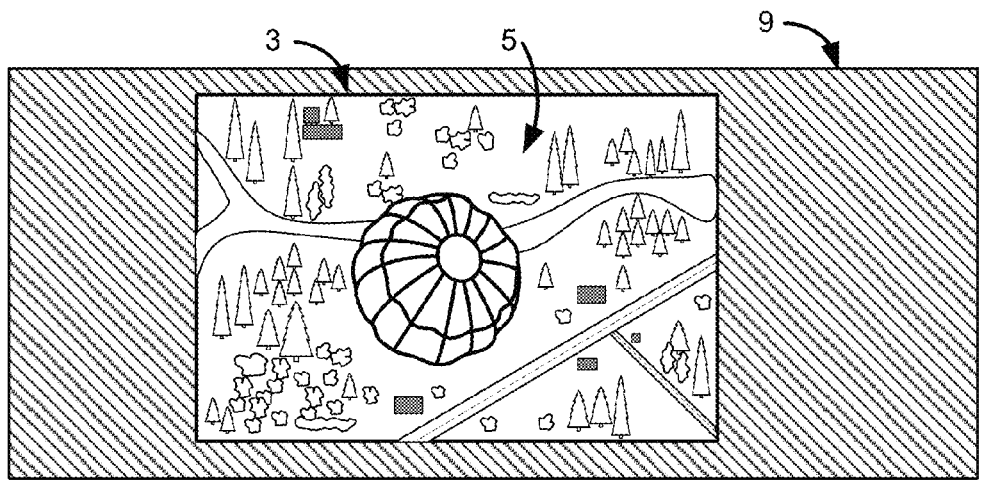
FIG. 17A, FIG. 17B, and FIG. 17C are diagrams illustrating how the orientation of the physical tag can influence the content of the virtual world.
Figure 17B:
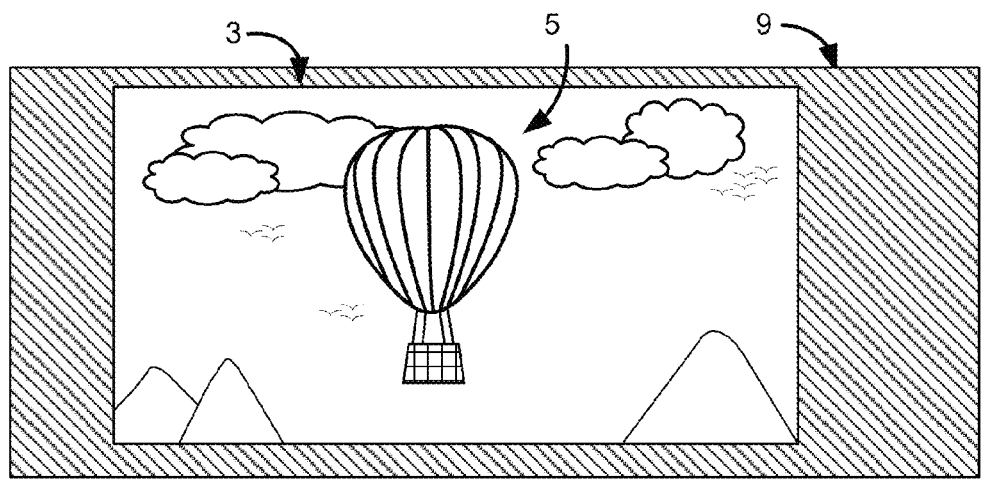
Figure 17C:
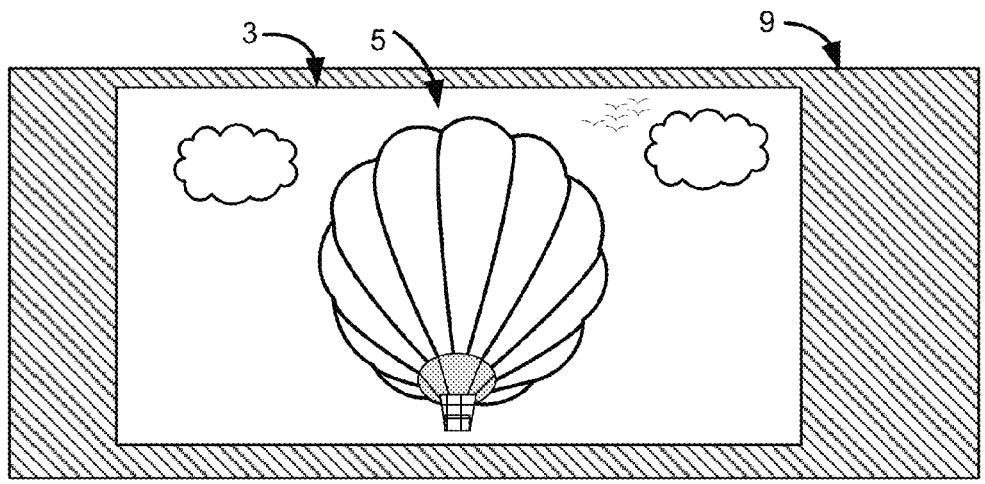

In one embodiment, the orientation of the physical tag 11 impacts the virtual objects 5 within the virtual hole 3. FIGS. 17A-17C will be used to illustrate. Consider the example in which the physical tag 11 is in a book 9. If the book 9 is sitting on a table 8, then the virtual hole 3 provides a "bird's eye view" to a virtual world, in one embodiment. FIG. 17A, shows a mixed reality image that a user may see in an HMD 2 when the physical tag 11 is resting on the surface of a table 8, as one example. The user is looking into the virtual hole 3 from above, wherein the virtual objects 5 that the user sees are the top of a hot air balloon and landscape below.

If the user takes the book 9 and holds in front of them such that the surface of the pages are now vertical, then the user may see an image such as the one depicted in FIG. 17B. The virtual objects 5 include a hot air balloon, clouds, birds, and mountains. The user's vantage point is at about the same elevation as the hot air balloon. In this example, the user's hypothetical vantage point might be in a nearby balloon.

If the user takes the book 9 and holds it above their head, then they might see a virtual image such as the one depicted in FIG. 17C. In this case, the virtual objects 5 that the user sees include a hot air balloon above them, a few clouds, and birds. Since the book is above the user's head, some of the objects in the virtual hole 3 could be real. For example, the clouds and birds could be real, whereas the hot air balloon is a virtual object 5.

Figure 18:
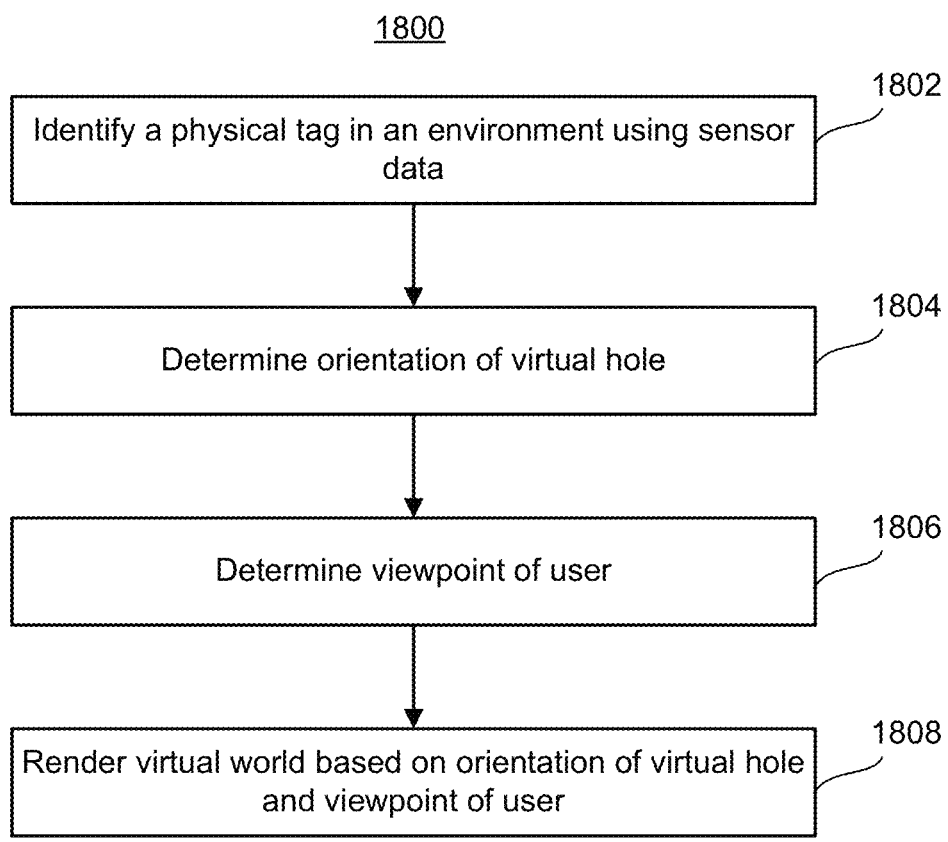
FIG. 18 is a flowchart of one embodiment of a process of rendering a virtual world in a virtual hole, wherein the virtual world depends on the orientation of the physical tag in the real world.

FIG. 18 is a flowchart of one embodiment of a process 1800 of rendering a virtual world in a virtual hole 3, wherein the virtual world depends on the orientation of the physical tag 11 in the real world. In step 1802, a physical tag 11 is identified using sensor data. In step 1804, an orientation of the virtual hole 3 is determined Examples of orientations have already been discussed with respect to FIGS. 17A-17C. In one embodiment, a plane is determined for the virtual hole 3 based on the location of the physical tag 11. The plane for the virtual hole 3 could be the same plane in which the physical tag 11 resides; however, this is not always the case.

In step 1806, the perspective of the user is determined Step 1806 factors in the location of the user as well as the location and orientation of the physical tag 11. Note that in the examples of FIGS. 17A-17C, the user is always more or less looking directly into the virtual hole 3. By looking directly in it is meant that the user is positioned as in the example of FIG. 2B. However, the user might be at an angle to the victual hole 3. By being at an angle it is meant that the user is positioned so that they cannot see all of the contents within the virtual hole 3, such as the example of FIG. 2A.

In step 1808, the virtual world is rendered in the HMD 2, based on the orientation of the virtual hole 3 and the viewpoint of the user. FIGS. 17A-17C show several examples.

In some embodiments, one or more steps of any of the processes described herein may be performed by executing instructions on one or more processors. Processors may access instructions that are stored on a variety of computer readable media. Computer readable media can be any available media that can be accessed by the processor and includes both volatile and nonvolatile media, removable and non-removable media. By way of example, and not limitation, computer readable media may comprise computer storage media. A computer storage device is one example of computer readable media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by processors. Combinations of the any of the above should also be included within the scope of computer readable media.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method comprising:
    determining, by an electronic system, a location for a virtual container with respect to a real world object in a real world environment, including determining a location for a cutout in a surface of the real world object and determining a location for a virtual container below the cutout, wherein the surface of the real world object comprises a surrounding region outside of the cutout;
    accessing, by the electronic system, a location of a virtual object within the virtual container;
    determining, by the electronic system, a location of a user wearing a see-through, near-eye, mixed-reality display device;
    determining, by the electronic system, what portion of the virtual object within the virtual container should be visible from the perspective of the user, including determining where the virtual container occludes a portion of the virtual object from the perspective of the user; and
    rendering, in the see-through, near-eye, mixed-reality display device, the virtual object within the virtual container to present an illusion that the virtual object is within the virtual container, including rendering the cutout in the surface of the real world object, rendering the virtual object to appear to be at the location in the virtual container and to be below the surface of the real world object from the perspective of the user, showing portions of the virtual object that would be visible from the perspective of the user seeing into the cutout, and occluding portions of the virtual object that would not be visible through the cutout from the perspective of the user, wherein the occluding includes occluding portions of the virtual object that are blocked by the surrounding region from the perspective of the user, wherein the showing includes not occluding any portion of the virtual object by the surrounding region when the perspective of the user allows the user to see the virtual object through the cutout without the surrounding region blocking any portion of the virtual object.

2. The method of claim 1, further comprising:
    identifying a tag in the real world environment using sensor data, wherein the determining a location for a virtual container with respect to a real world environment includes determining a location for the virtual container relative to the tag.

3. The method of claim 2, further comprising:
    determining an orientation of the tag in the real world environment, wherein the rendering the virtual object within the virtual container includes:
    rendering the virtual object based on the orientation of the tag and the perspective of the user, including showing a different side of the virtual object in the see-through, near-eye, mixed-reality display device depending on the orientation of the tag and the perspective of the user.

4. The method of claim 1, wherein the determining, by the electronic system, a location for a virtual container with respect to a real world object in a real world environment includes:
    accessing image data;
    identifying, based on the image data, the user tracing an outline on the surface of the real world object; and
    defining the cutout as being the outline.

5. The method of claim 1, wherein the rendering the virtual object within the virtual container includes occluding a portion of the virtual object with the virtual container based on where the virtual container occludes a portion of the virtual object from the perspective of the user.

6. A display system comprising:
    a see-through, near-eye mixed reality display device;
    an image sensor that is configured to track a real world environment;
    logic in communication with the display device and the image sensor, wherein the logic is configured to:
    receive image data from the image sensor;
    determine a boundary for a virtual container with respect to a real world object in the real world environment, wherein the virtual container comprises a cutout in a surface of the real world object and a virtual container below the cutout, wherein the surface of the real world object comprises a surrounding region outside of the cutout;
    determine a location a user wearing the see-through, near-eye, mixed-reality display device;

accessing a location of a virtual object within the virtual container;

determine how the virtual object within the virtual container should appear from the perspective of the user, including the logic being configured to determine where the virtual container occludes a portion of the virtual object from the perspective of the user;

render the virtual container in the see-through, near-eye, mixed-reality display device to appear to comprise the cutout in the surface of the real world object; and render the virtual object within the virtual container in the see-through, near-eye, mixed-reality display device from the perspective of the user, wherein the logic being configured to render the virtual object comprises the logic being configured to:

i) render the virtual object to appear to be at the location in the virtual container and below the surface of the real world object from the perspective of the user;

ii) occlude portions of the virtual object that are blocked by the surrounding region from the perspective of the user; and iii) show portions of the virtual object that are not blocked by the surrounding region when the perspective of the user allows the user to see the virtual object through the cutout.

7. The display system of claim 6, wherein the logic is configured to:
identify a tag using sensor data and to determine a location for the boundary of the virtual container relative to the tag.

8. The display system of claim 7, wherein the logic is configured to:
determine an orientation of the tag and to render the virtual object within the virtual container based on the orientation of the tag and the perspective of the user.

9. The method of claim 1, further comprising:
rendering the virtual object at a location outside of the virtual container in the see-through, near-eye, mixed-reality display device, the virtual object having data associated with it;
tracking, by a tracking camera that captures image data to track the real world environment, user motion in the image data;
comparing the user's motions in the image data to the location of the virtual object;
determining, by the tracking camera, that the user's motions in the image data has swept the virtual object into the virtual container; and
storing, by the electronic system, an indicator that the data associated with the virtual object was saved in response to the virtual object being swept into the virtual container.

10. The method of claim 9, further comprising:
determining, by the tracking camera that tracks the real world environment, that the user's motions have removed the virtual object from the virtual container; and
retrieving, by the electronic system, the data associated with the virtual object in response to the virtual object being removed from the virtual container.

11. The method of claim 10, wherein the data is a document.

12. The display system of claim 6, wherein the logic is further configured to:
generate a 3D model of the real world environment based on the image data;
define a location of the cutout with respect to the 3D model;
define the location of the user with respect to the 3D model; and
define the location of the virtual object within the virtual container with respect to the 3D model, wherein the logic being configured to determine how the virtual object within the virtual container should appear from the perspective of the user comprises the logic being configured to determine the perspective of the user based on the location of the cutout with respect to the 3D model, the location of the virtual object within the virtual container with respect to the 3D model, and the location of the user with respect to the 3D model.

13. The display system of claim 12, wherein the logic being configured to render the virtual object within the virtual container in the see-through, near-eye, mixed-reality display device from the perspective of the user comprises:
the logic being configured to render the virtual object at the location of the virtual object within the virtual container with respect to the 3D model.

14. A display system comprising:
a see-through, near-eye mixed reality display device;
an image sensor that tracks a real world environment;
logic in communication with the display device and the image sensor, wherein the logic is configured to:
determine an orientation of a surface of a real world object in a real world environment;
determine a location for a virtual hole in the surface of the real world object;
access a location of a virtual object within the virtual hole;
determine a location of a user wearing the see-through, near-eye, mixed-reality display device;
determine a perspective of the user relative to the surface of the real world object;
determine what portion of the virtual object within the virtual hole should be visible from the perspective of the user;
render the virtual object within the virtual hole in the see-through, near-eye, mixed-reality display device to present an illusion that the virtual object is within the virtual hole, including the logic being configured to render the virtual object based on the orientation of the surface and the perspective of the user comprising the logic being configured to:
i) render the virtual object within the virtual hole as if the user is looking down on the virtual object from above the virtual object when the user's perspective is above the surface of the real world object; and
ii) render the virtual object within the virtual hole as if the user is looking up on the virtual object from below the virtual object when the user's perspective is below the surface of the real world object.

15. The display system of claim 14, wherein the logic being configured to render the virtual object within the virtual hole comprises the logic being configured to render the virtual hole to appear to comprise a cutout in the surface of the real world object, being configured to render the virtual object to appear to be below the surface of the real world object from the perspective of the user, and being configured to show only those portions of the virtual object that would be visible from the perspective of the user seeing into the cutout.

16. The display system of claim 14, wherein the logic being configured to render the virtual object based on the orientation of the surface and the perspective of the user further comprises the logic being configured to:
render the virtual object within the virtual hole to provide a side view of the virtual object when the surface is vertical.

17. The display system of claim 6, wherein the logic configured to show only a portion of the virtual object that would be visible from the perspective of the user seeing into the cutout and to occlude a portion of the virtual object that would not be visible through the cutout from the perspective of the user looking into the cutout comprises the logic being further configured to:
   render a top portion of the virtual object and occlude a bottom portion of the virtual object when viewed from an angle at which the top portion would be visible through the cutout from the perspective of the user and the bottom portion would not be visible through the cutout from the perspective of the user.

18. The display system of claim 17, wherein the logic configured to show only a portion of the virtual object that would be visible from the perspective of the user seeing into the cutout and to occlude a portion of the virtual object that would not be visible through the cutout from the perspective of the user looking into the cutout comprises the logic being further configured to:
   render the virtual object without occluding any portion of the virtual object with boundaries of the virtual container when viewed from an angle at which the virtual object would not be occluded by boundaries of the virtual container from the perspective of the user.

19. The display system of claim 6, wherein the logic is further configured to:
   store data that represents a shape of the virtual container; and
   determine, based on the stored data, whether the virtual container will block the virtual object from the perspective of the user.

20. The display system of claim 10, wherein the data defines a size of the virtual container, wherein the logic being configured to store data that represents the shape of the virtual container comprises the logic being configured to dynamically change the size of the virtual container.

21. The display system of claim 6, wherein the logic being configured to render the virtual object comprises the logic being further configured to:
   iv) occlude portions of the virtual object that are occluded by the container from the perspective of the user.

* * * * *